United States Patent
Takashige et al.

[11] Patent Number: 5,925,305
[45] Date of Patent: Jul. 20, 1999

[54] ORIENTED FILM EASY TO SPLIT AND METHOD OF PRODUCING THE SAME

[75] Inventors: Masao Takashige; Takeo Hayashi; Katsumi Utsuki; Takehiro Iwamoto, all of Himeji, Japan

[73] Assignee: Idemitsu Petrochemical Co., Ltd., Tokyo, Japan

[21] Appl. No.: 08/616,248

[22] Filed: Mar. 15, 1996

Related U.S. Application Data

[62] Division of application No. 07/967,249, Oct. 27, 1992, Pat. No. 5,541,011.

[30] Foreign Application Priority Data

Oct. 28, 1991 [JP] Japan .................................. 3-308427
Oct. 31, 1991 [JP] Japan .................................. 3-313675

[51] Int. Cl.$^6$ .......................... B29C 55/28; B29C 53/08
[52] U.S. Cl. ................ 264/519; 264/146; 264/209.5; 264/210.2; 264/210.5; 264/210.7; 264/235.8; 264/289.6; 264/290.2; 264/342 RE; 264/346; 264/567
[58] Field of Search .............................. 264/210.2, 209.5, 264/210.7, 290.2, 342 RE, 567, 519, 346, 146, 235.8, 289.6, 210.5

[56] References Cited

U.S. PATENT DOCUMENTS 3,678,546 7/1972 Matsugu et al. ..................... 264/567
3,946,089 3/1976 Furukawa et al. .................. 264/210.7
4,978,484 12/1990 Takashige et al. .................. 264/146
5,094,799 3/1992 Takashige et al. .................. 264/209.5
5,158,637 10/1992 Takashige et al. .................. 264/209.5

FOREIGN PATENT DOCUMENTS 2635164 4/1977 Germany .......................... 264/210.7
51-90370 8/1976 Japan .............................. 264/210.7
56-62129 5/1981 Japan .............................. 264/290.2
58-158224 9/1983 Japan .............................. 264/210.7
4-47924 2/1992 Japan .............................. 264/290.2

Primary Examiner—Jan H. Silbaugh
Assistant Examiner—Mark Eashoo
Attorney, Agent, or Firm—Flynn, Thiel, Boutell & Tanis, P.C.

[57] ABSTRACT

An oriented splittable film which contains nylon and meta-xylylene adipamide at a weight ratio of 40–85:15–60 and which was oriented with a magnification above 2.8 times in both directions of MD and TD. Examples of nylon include nylon 66, nylon 6-66 copolymer and so on. Under this manufacturing method for an oriented splittable film, when a raw film is heated in a biaxially orienting process, such as the tubular method, the heating temperature at the side part of the film, in the direction of film width,,when folding the bubbles, is controlled along the circumference direction of the bubbles so that it is lower than the heating temperature of the part of the film which is used later as a product. The heat treatment process for these films includes a first heat treatment step implemented for films at temperatures between 120 degrees C and 190 degrees C based on the tubular method or tenter method and a second heat treatment step implemented for films at temperatures between 190 degrees C and 220 degrees C based on the tenter method.

6 Claims, 17 Drawing Sheets

FIG. I
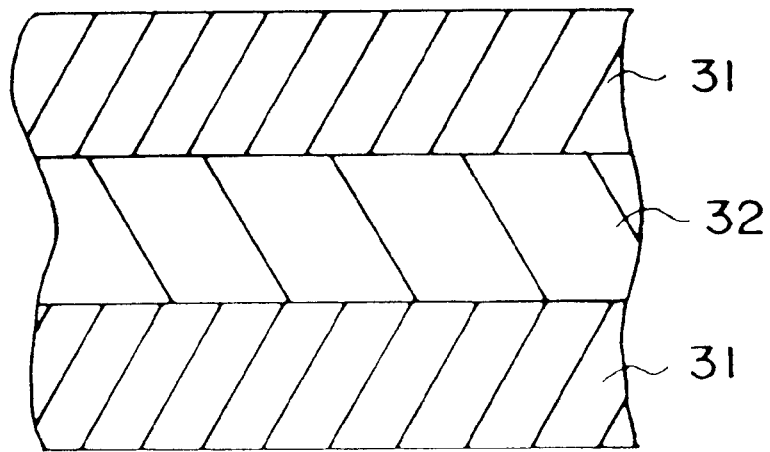
FIG. 2
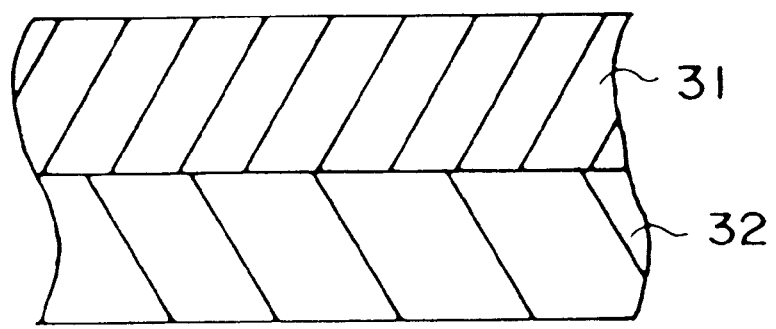

F I G.13
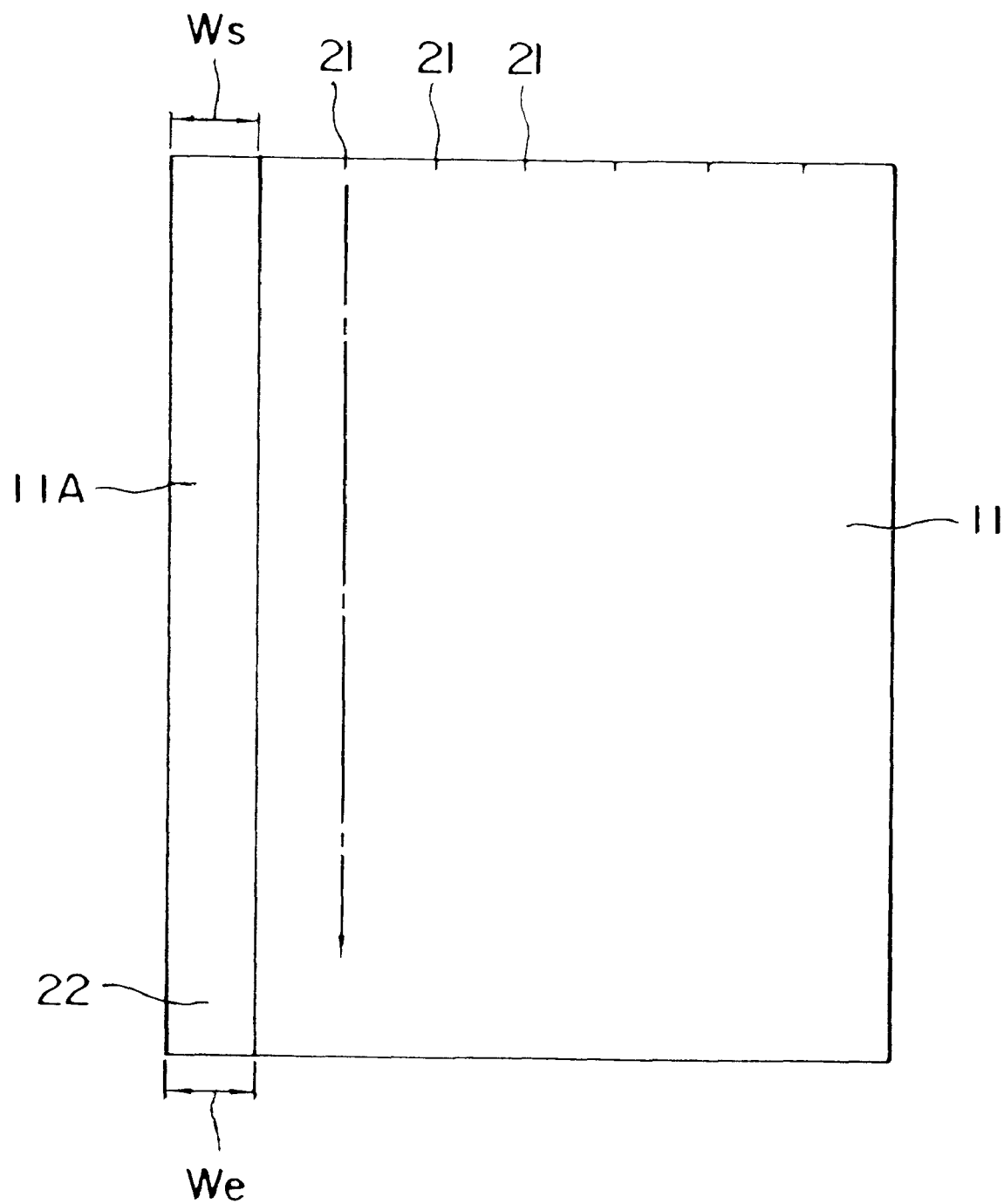

ORIENTED FILM EASY TO SPLIT AND METHOD OF PRODUCING THE SAME

This is a division of Ser. No. 07/967,249, filed Oct. 27, 1992 now U.S. Pat. No. 5,541,011.

BACKGROUND OF THE INVENTION

1. Field of the Invention

The present invention is related to a splittable film and a production method thereof, e.g. a base film for a bag to pack foods, medicines, industrial products and so on.

2. Description of the Related Art

In recent years, films such as linear chain low density polyethylene (L-LDPE) have been widely used as a sealable base film for bags to pack foods, medicines and so on. However, this L-LDPE film, was safe to pack contents because the seal strength was excellent, but its split resistance was too large for cutting the film straight along a predetermined direction when opening up a bag. In consideration of these problems, various inventions have been proposed to give the film the features of ease in splitting and ease in cutting straight.

Examples: (a) a laminated film using a uniaxial oriented film for a middle layer film (Japanese Patent Application Publication No. 58-38302 bulletin, Japanese Patent Application Publication No. 55-31725 bulletin); minute blemish in the surface thereof; (c) a (laminated) film with an opening tape attached to an opening part; and so on.

In the laminated film (a) mentioned above, because one layer is added as the middle layer film, the material cost and the processing cost to laminate films on top of one another increase. A uniaxial oriented film is used as a middle layer film but its use does not contribute strength. In the laminated film (b), even if the ease of opening can be improved by the minute blemishes on the film, the ease in cutting the film straight is controlled by the feature of the base material itself. Even if the blemishes on the surface are few, there is a fear of decreasing the strength of the film. As for the film (c), because the tape for the opening is additionally used, the cost becomes higher, which may cause a decline in the productivity.

Also, conventionally, a plastic film was heat-treated to fix molecular orientation after the film was biaxially oriented by the tubular method for the purpose of obtaining stability in the dimension. In the heat-treatment, when a film of tubular nylon 6 folded flatly is heat-treated by the tenter method, the upper and lower films melt and stick to each other and thereafter it is impossible to separate them into two sheets.

Thus, the film processed by means of prior art was unusable as a product. These problems are conspicuously seen when a plastic film is a crystalline thermoplastic resin film like a polyamide. Formerly, to solve the technical problems, one improved tenter method (Japanese Patent Application Publication No. 46-15439 bulletin) was proposed, wherein the film that was folded flat after being biaxially oriented in a tubular situation is separated into two films by cutting both edges in the direction of the width, they are introduced into the tenter and both edges of each film are held with clips to keep a certain distance between each film Incidentally, adopting the tubular method, where the tubular film formed into a bubble shape by compression of air is heat-treated, can solve the problem of sticking together of the films due to heat. However, though in the heat treatment based on the above-mentioned improved tenter method, the films did not stick to each other, a bowing phenomenon (a phenomenon where a delay in the orientation at the central part occurs compared with both side parts) conspicuously occurred Though lowering a heat treatment temperature naturally decreased the bowing ratio, it brought about a new problem of increasing the shrinkage percentage in the heat treatment of the boil, retort and so on.

The purpose of the present invention is to provide an oriented film that is easy to split and features excellent splitability, ease in cutting the film straight and enough impact strength and also to provide a production method for the oriented splittable film to obtain these features effectively.

SUMMARY OF THE INVENTION (A) The oriented splittable film based on the present invention means a film including nylon (Ny) and meta-xylylene adipamide (MXD6). The weight ratio Of the above mentioned Ny and MXD6 is 40–85:60–15. The orientation ratio in the production process of the film in MD direction (the direction of the movement of the film), and TD direction (the width direction of the film) are respectively 2.8 and over.

(A-a) A case where nylon 66 (Ny66) is used as an example of Ny.

The weight ratio between Ny66 and MXD6 is for example, 40–85:60–15 but 50–80:50–20 is more desirable When the ratio of MXD6 is smaller than 15, the splitability and the ease in cutting the film straight tend to lessen. Oppositely, when the ratio of MXD6 is more than 60, the practicality becomes poor because the impact strength falls substantially. On the other hand, Ny66 is used for the sake of heat resistance of the oriented splittable film. The production of the oriented splittable film is conducted by first mixing Ny66 and MXD6 at weight ratio of 40–85:60–15, fusing and extruding it, and orienting a raw film obtained by cooling down at the magnification ratio of 2.8 and over in the directions of MD and TD. Incidentally, though the raw film is oriented at the magnification ratio of 2.8 and over, the desirable ratio is 3.0 and over. This is because when the orientation ratio is smaller than 2.8 times, the splitability and the ease in cutting the film straight becomes worse. The impact strength also decreases, so there is a problem in practical use. The term "orientation" used above means a simultaneous biaxial orientation based on the tubular method. It is also possible to add additional substances to the oriented splittable film based on the present invention if necessary. Available additions are anti-blocking pill (inorganic filler and so on), water repeller (ethylene-dis-stearic acid ester and so on), lubricant (stearic acid calcium and so on) and so on. Incidentally, the oriented splittable film according to the present invention can laminate with other films.

(A-b) A case where nylon 6-66 copolymer (Ny6-66) is used as an example of Ny.

The weight ratio between Ny6-66 and MXD6 is, for example, 40–58:60–15, preferably 50–80:50–20. When the ratio of MXD6 is out of the above-mentioned range, the characteristic of MXD6 is the same as that of Ny66 explained in (A-a) column above. Ny6-66 is used for the purpose of giving the oriented splittable film shrinkage. The production condition of this oriented splittable film is the same as that of Ny66 . Incidentally, like Ny66 mentioned above, it is possible to use this oriented splittable film as one film in a laminated splittable film having more than one layer of films. The laminated splittable film comprising an oriented splittable film as the 1st layer film, a film of various types as the 2nd layer film, and a sealable film as the 3rd layer film is taken for example. Incidentally, the composition of the 1st layer film and the 2nd layer film can be reversed. Biaxially oriented, uniaxial oriented or non-oriented films made of materials such as PET (poly ethylene teraphthalate), EVOH (ethylene-vinyl acetate copolymer saponification one), PVA (polyvinyl alcohol), PP (polypropylene), PVDC (polyvinylidene chloride), HDPE (high density polyethylene), PS (polystyrene) and so on are suitable for the basic film as the 2nd layer film. In addition, of course, it is possible to use a metallic film like aluminum foil as the base film, too. For the material for the sealable film as the 3rd layer film, L-LDPE (linear chain low density polyethylene), LDPE (low density polyethylene), HDPE (high density polyethylene), EVA (ethylene-vinyl acetate copolymer), PB (polybutene-1), CPP (non-orienting polypropylene), ionomer, PMMA (polymethyl methacrylate) and so on are suitable and a mixture of these can be used as the material for the sealable film, too. As for the laminate method in the laminated splittable film, in which more than one film is laminated on top of one another, an extrusion laminate, a hot melt laminate, a dry laminate, and a wet laminate are suitable.

(A-c) In a case that nylon 6 (Ny6) is used as an example of Ny.

Especially when it is used as the 1st layer of two layers and laminated with the 2nd layers of EVOH at a thickness ratio of 2:1–1:2.

In this case, the weight ratio of Ny6 and MXD6 in the 1st layer is 40–85:60–15, preferably 50–80:50–20. When MXD6 is out of the above-mentioned range, the characteristic is the same as in the case that Ny66 in column (A-a) above. When laminating a layer comprising of EVOH, an oriented splittable film can be expected to have a gas barrier feature The ethylene content of EVOH in the 2nd layer is, for example, 25–45 mol %, but 29–38 mol % is more desirable. When the ethylene content is smaller than 25 mol %, the 2-layer formation is difficult. When it is larger than 45 mol %, the gas barrier feature cannot be expected. As for the thickness ratio between the 1st layer and the 2nd layer, when the thickness of the 1st layer becomes smaller than half of the thickness of the 2nd layer, the ease in splitting, which is the purpose of the present invention, is lowered. Incidentally, on the condition of laminating the 1st layer and the 2nd layer as one, further laminating is optionally possible. The examples are shown in the attached FIGS. 1–4. FIG. 1 shows a film having a 3-layer structure where the 1st layer 31 is laminated on both surfaces of the 2nd layer 32. FIG. 2 shows a film having a 2-layer structure where the 1st layer 31 and the 2nd layer 32 are laminated. FIG. 3 shows a film having a 5-layer structure where the 3rd layer 33 of Ny6 is laminated on both surfaces of the 3-layer structure shown in FIG. 1. FIG. 4 shows a film having a 3-layer structure where the 2nd layer 32 is laminated on both surfaces of the 1st layer 31. Incidentally, the thickness of each film, which is shown in FIGS. 1–4, is optionally determined but it is about 8–50 micrometers as a standard. It is possible to laminate the above-mentioned film on other films with the condition that the 1st and 2nd layers are laminated as one. The examples are shown in FIGS. 5 and 6. For simplicity in explanation, in these figures, the oriented splittable film is considered one of several films consisting of laminated films. Concretely, FIG. 5 shows a laminated splittable film comprising two sheets of base material films 41 and 42, the oriented splittable film 43, and the sealable film 44 laminated in this order. FIG. 6 shows another laminated splittable film comprising three kinds of films, wherein the splittable film 43 and the sealable film 44 are laminated to one base film 41.

(A-d) In a case that the oriented splittable film with nylon 6 (Ny6) is used as the 2nd layer and a layer containing Ny6 and MXD6 as the 1st and 3rd layer is laminated thereto.

The weight ratio of Ny6 and MXD6 in the 1st and 3rd layers is 60–95:40–5. The MXD6 content against Ny6 in the 2nd layer is greater than those in the 1st and the 3rd.

In this case, the weight ratio of Ny6 and MXD6 in the 1st and 3rd layers is 60–95:40–5, but 70–90:30–10 is more desirable. When Ny6 content is smaller than 60, the pinhole resistance declines. Oppositely, when Ny6 content is larger than 95, the ease in cutting straight, which is the purpose of the present invention, declines. The thickness ratio in the 1st–3rd layer is e.g. 1:8:1–4:2:4, but 15:70:15–35:30:35 is more desirable. Also, the thickness ratio between the 1st (or the 3rd) and the 2nd layer is, e.g. 1:8–2:1, but 15:70–35:30 is more desirable. Incidentally, when this ratio is smaller than 1/8, the pinhole resistance declines. Also, the thickness ratio between the 1st layer and the 3rd layer is 1:2–2:1. FIG. 7 shows a film having a 3-layer structure wherein the 1st layer 31, the 2nd layer 32 and the 3rd layer 33 are laminated in this order, but as long as the 1st–3rd layers are united into one, the laminating order of each layer does not matter. As in the cases of above-mentioned columns (A-a)–(A-c), this oriented splittable film can be laminated with other films on the condition that the 1st-3rd layers are laminated as one.

(A-e) In a case that a sealable film is laminated against the oriented splittable film with nylon 6 (Ny6) and more than one other films are further laminated.

The examples are shown in FIGS. 8 and 9. FIG. 8 shows a laminated film having a 3-layer structure wherein a sealable film 44 is the 1st layer film, an oriented splittable film 43 is the 2nd layer film, and a base film 41 is the 3rd layer film and they are laminated in this order. FIG. 9 shows another laminated film having a 4-layer structure wherein base films 41 and 42 are the 1st and 2nd layer films, an oriented splittable film 43 is the third layer film, and a sealable film 44 is the 4th layer film and they are laminated in this order.

(B) The method of producing the above-explained oriented splittable film in the present invention comprises the steps of: producing a raw film by fusing and extruding a raw material mixture containing nylon (Ny) and meta-xylylene adipamide (MXD6) at a weight ratio of 40–85:60–15 from an extruder; orienting biaxially the raw film with an orientation ratio of 2.8 and over in MD direction and TD direction by the tubular method; folding the oriented film flat; and heat-treating the folded film.

(B-a) Before the step of fusing and extruding by the extruder, an additional step of kneading the raw material mixture by fusing at a temperature of 300 degrees C and under can be added.

When additionary providing a process of kneading the raw material mixture by fusing at the temperature of 300 degrees C and under, an excellent precision of the thickness can be gained. A kneading machine which is the raw material mixture can be optionally selected, but a biaxial kneading machine is desirable. Also, the temperature of fusion in the case of kneading by fusion should be kept at 300 degrees centigrade and under because the fabricability in orientation is lowered at a temperature higher than 300 degrees C. Also, it will lower an impact strength and the ease in cutting straight of the oriented splittable film.

(B-b) In the step of biaxial orientation using the tubular method, it is desirable that the temperature should be controlled along the circumference direction of the bubble-like raw film so that a heating temperature in the side part in the width direction when folding the bubble-like raw film may be lower than that in other parts which will be used as a product later. By controlling the heating conditions at the tire of the biaxial orientation, a bowing phenomenon which is in the reverse direction of a bowing phenomenon which occurs in the latter heat treatment process is caused intentionally, by which a reduction in the bowing ratio is achieved To expect such an operation, it is necessary to control the temperature of the heater when heating the side part in the width direction when folding the bubble-like raw material film and to control the heater when heating other parts which will be used as a product later The temperature of the heater when heating the side part in the direction of the width of the bubble-like raw film is adjusted to 10–100 degrees centigrade, preferably, 20–90 degrees lower than the average temperature of all the heaters. Also, the temperature of the heater when heating the other part which is used as a product is adjusted to be 10–100 degrees, preferably 20–90 degrees higher than the average temperature of all the heaters Incidentally, when the temperature difference of each heater is less than 10 degrees centigrade, the bowing phenomenon in reverse direction does not reach the expected condition and when the temperature difference of each heater is more than 100 degrees C, the shape of the bubble does not stabilize. In order to separately control the temperature of the heater that heats the side part in the direction of the width when folding a film and the heater that heats the other part which is used as a product, for example, two heaters to heat the side part in the width direction of the bubble-like raw film and two heaters to heat the other part which is used as a product are needed. Also, because the temperature inclination covering all the circumference of the bubble-like raw film should be as gentle as possible, it is desirable to prepare more than four heaters to improve the heat control over the film. Moreover, it is desirable to heat the bubble-like raw film so that the heating temperature at the end in the film width direction may be lowest and that at the center part of other parts that are used as a product may be highest. But, the heat treatment of the raw film should be done at a temperature lower than the melting point of the film (220 degrees centigrade).

(B-c) The heat treatment of the film that is folded flat should be done in two steps; the first heat treatment process at a temperature of 120–190 degrees C by the tubular method and a second heat treatment process at a temperature of 190–220 degrees C by the tenter method.

Because the 2-stage heat treatment can check bowing, the ease in cutting straight along the width direction at any place on the film obtained as a product is improved. Also, the adhesion and stickiness by fusion which often occurred in the process of heat treatment can be prevented. The first heat treatment by the tubular method is done with a temperature range of 120–190 degrees C for example, but 140–190° C. is desirable. When the temperature is lower than 120 degrees C, curling of the film is too large, so that both side parts are difficult to hold. Also, when the temperature is higher than 190 degrees C, because films stick to each other by fusion, it is impossible to separate a film that is stuck together into two sheets after the 1st heat treatment process. Incidentally, it is desirable that the heat treatment time is one second and over. When it is under 1 second, a heat fixation tends to be insufficient. Though there is no upper limit of heat treatment time, the longer the treatment time becomes, the more orientation equipment is required, which makes the cost higher. Therefore, the heat treatment time should normally be between 1–30 seconds. In the first process of heat treatment, the film relaxation ratio is set to be 15% and under (in MD direction and/or TD direction), and desirably, it should be set to be 10% and under. By giving the film heat treatment when the film is relaxed a little, a crystallinity of the film is improved and the reduction of relaxation ratio is achieved and consequently, a film with dimensional stability is obtained. In heat treatment by the tubular method, the bowing ratio is 0. Moreover, because a shrinkage stress falls, a bowing ratio caused by the second heat treatment process declines. In other words, anisotropy of the material in the width direction of the film reduces and as a result, the ease to cut the film straight is improved further.

The 2nd process of the heat treatment by the tenter method is done with a temperature range of 190–220 degrees C, preferably 190–215 degrees C. When it is lower than 190 degrees C, a shrinkage ratio becomes large and isn't desirable. Also, when it is higher than 220 degrees C, a fusion among films occurs and it is impossible to roll them as products of two sheets. Incidentally, the heat treatment time is the same as the heat treatment time in the above-mentioned 1st process. In the 2nd process of heat treatment, the film relaxation ratio is set to be 15% and under, preferably 10% and under. It is also desirable that after the first step of heat treatment, both ends of the width direction of the film are cut open to separate them in two and that the 2nd process of heat treatment should be done with air contained between the films. Moreover, as for the heat treatment process of the film folded flat, it is possible to implement the heat treatment of the 1st process based on the tenter method instead of the above-mentioned tubular method. The heat treatment temperature in this case is, e.g. 120–190 degrees C, but 140–190 degrees C is desirable When lower than 120 degrees C, two sheets of film are fused in the 2nd process of the heat treatment and the stability in the ease in cutting the film straight is lowered On the other hand, when higher than 190 degrees C, in the first process of the heat treatment, fusion of two sheets occurs. Incidentally, the relaxation ratio of the film and the heat treatment time by this tenter method are the same as in the tubular method.

BRIEF DESCRIPTION OF THE DRAWINGS

FIGS. 1–11 are sectional views which show a construction of the film according to the present invention.

FIG. 13 is a view which shows a way of evaluating the ease in cutting the film straight.

DETAILED DESCRIPTION OF THE PREFERRED EMBODIMENT(S)

The following are explanations of the experimental examples and the comparative examples based on the present invention. The experimental examples concerning claims 2 and 3 are shown in 1–11 and the control examples thereof are shown in 1–8. The experimental examples concerning claims 4 and 5 are shown in 12–22 and the control examples thereof are shown in 9–16. The experimental examples concerning claims 6–8 are shown in 23–40 and the control examples thereof are shown in 17–30. The experimental examples concerning claims 9 and 10 are shown in 41–59 and the control examples thereof are shown in 31–41. The experimental examples concerning claim 11 are shown in 60–67 and the control examples thereof are shown in 42–48. The experimental examples concerning claim 12 are shown in 68–73 and the control examples thereof are shown in 49–52. The experimental examples concerning claims 13–17 are shown in 74—80 and the control examples thereof are shown in 53–58. The experimental examples concerning claim 18 are shown in 81–86 and the control examples thereof are shown in 59–63. The experimental examples concerning claim 19 are shown in 87–93 and the control examples thereof are shown in 64–70.

Experimental Example 1

Figure 12:
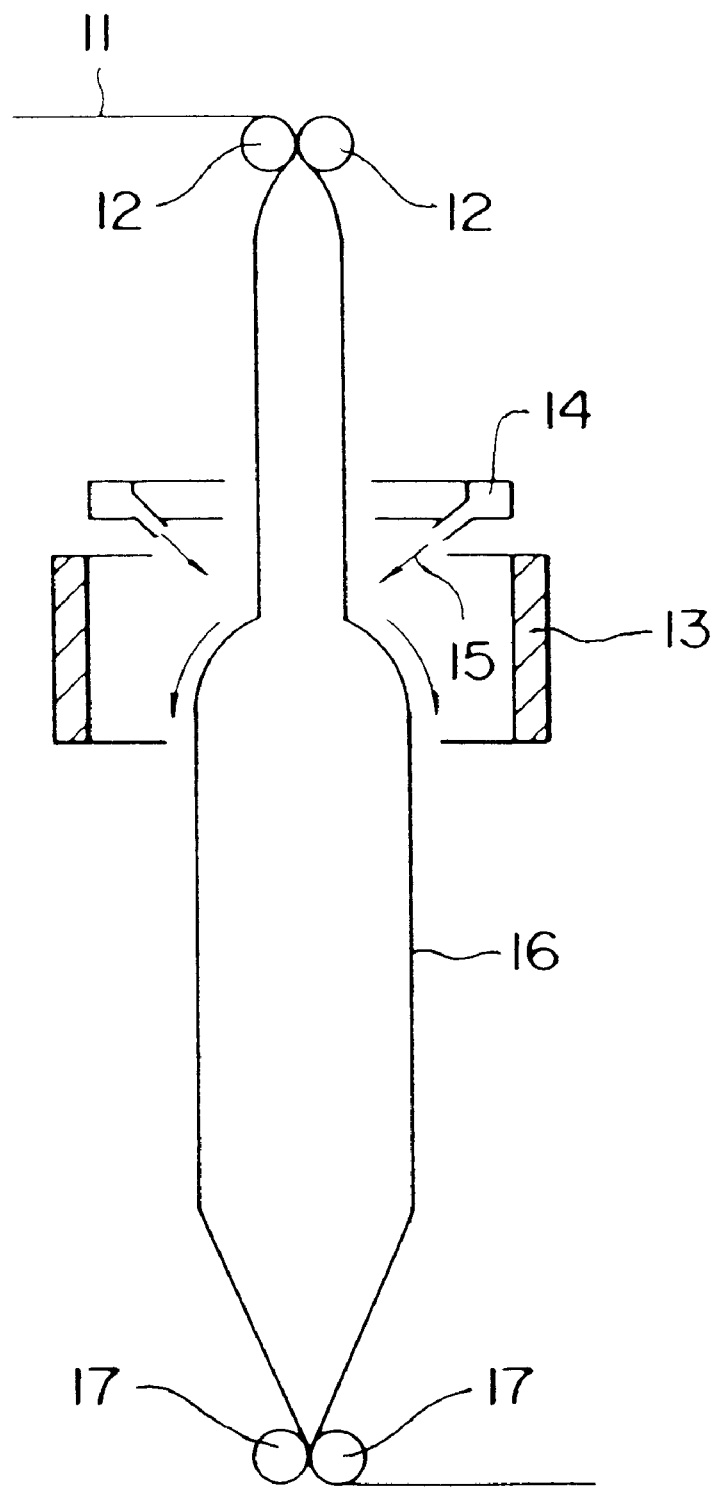
FIG. 12 is a schematic diagram of equipment used in the production method of the oriented splittable film of this invention.

First, a raw film 11 (see FIG. 12) was obtained by fusing and kneading a material mixture containing nylon 66 (Ny66) and meta-xylylene adipamide (MXD6) at a weight ratio of 80:20 in an extruder at a temperature of 280 degree, subsequently extruding the fused material from an accompanied die with the diameter of 90 mm into a cylinder-like film and cooling the thus-obtained film down with water. Nylon 66 produced by Ube Kosan Co. LTD. (the tradename: UBE nylon 2026, a relative viscosity=3.5) was used as Ny66 in this experimental example 1. Also, meta-xylylene adipamide produced by Mitsubishi Gas Chemicals Co. Ltd. (the tradename: MX nylon 6007, a relative viscosity=2.7) was used as MXD6 in this example. As shown in FIG. 12, the raw film 11 was inserted into a pair of pinch rollers 12 and then heated from the outside by a heater 13 with an air forced into the inside. Near the starting point, when the raw film 11 begins to biaxially orient and grow into a bubble 16, air 15 is blown from an aerator 14. Incidentally, the bubble 16 is continuously drawn into a pair of inch rollers 17. Through these steps, the simultaneous biaxial orientation is conducted in MD and TD directions by the tubular method, wherein the orientation ratios in both directions are 3.0. The biaxial oriented film obtained in such a way was then sent to a heat treatment furnace based on the tenter method, whereby the film was heat-fixed at 210 degrees centigrade and became a biaxial oriented film. Incidentally, this biaxial oriented film is the oriented monolayer splittable film containing Ny66 and MXD6 . The oriented splittable film (a 15-micrometer thickness) was used as a base film for the surface and was laminated with L-LDPE film as a sealable film (Tradename: Unilax LS-722C, produced by Idemitsu Petrochemical Co. Ltd. 50 micrometers thickness) according to the dry-laminate method and then it became the laminated splittable film of this experimental example. This laminated splittable film can be made into a splittable bag by processing in a bag making machine. In the attached Table 1, the measurement results of the tear strength and the impact strength for the oriented monolayer splittable film and the evaluation results of the ease in splitting and the ease in cutting the film straight are shown. As for the laminated splittable film, the ease to split and the ease to cut straight estimated and the results are shown in Table 2. Also, in Table 2, the results of strength against falling tests are shown for the purpose of evaluating the practicality of the bag made of the laminated splittable film. Incidentally, as for the split strength, it was measured by Elemendorf split strength (kg/cm) following JIS-Z1702 in the direction of the orientation of the film. Also, the impact strength was measured by using a film-impact tester produced by Toyo Seiki Co. Ltd., wherein the impact strength was measured by punching the laminated film which was fixed on a ring with a semi-tubular pendulum (a diameter; ½ inch, weight; 30 kg-cm). As for the results of the measurements, the impact strength of 4,500 kg*cm/cm and over is represented by a circle, and that of smaller than 4,500 kg*cm/cm is represented by a cross. When an impact strength is smaller than 4,500 kg*cm/cm, the efficiency as a base material for the surface is lowered, thus, the practicality of its use as a base material for liquid packing is low. As for the evaluation of the ease in splitting, when the value "E" (Elemendorf split strength), is 7 kg/cm and under, it is represented by a circle, when the value E is between 7 and 9 kg/cm, it is represented by a triangle, and when it is 9 kg/cm and over, it is represented by a cross. When the value E becomes more than 9 kg/cm, the ease in splitting is conspicuously lowered and the ease in cutting straight is drastically decreased. The evaluation of the ease in cutting straight is made in the following procedure. As is shown in FIG. 13, it is supposed that slits 21 are put at a certain interval Ws=2 cm on the film 11 having a width of 20 cm. When 20 the film 11 is torn from one end along the slit 21, the width We of the other end 22 of the film piece 11A is measured. It is possible to calculate deviation $\alpha$ with the width Ws on the one side of the film 11A and the width We of the other side as follows.

$$\alpha = [(Ws - We) / Ws] \times 100$$

In this experimental example, such measurement was conducted for 10 sheets of film pieces 11A, wherein, an average deviation of less than ± 10% is represented by a double circle (the ease to cut the film straight is excellent), between ± 10% and ± 30% is represented by a circle (the ease to cut the film straight is good), and more than ± 30% is represented by a cross (the ease to cut the film straight is insufficient). When the average is more than ± 30%, it is difficult to cut film 11 straight. The strength against falling is determined by checking whether the bag is torn when the splittable bag (130 mm×150 mm) containing 150 cc of liquid made up of equal quantities of water and antifreeze is dropped from the height of 2 m repeatedly 20 times in a condition that the front and the back sides of the bag are oriented parallel to the dropping spot on the ground. But, the test temperature is −20 degrees C. The dropping test was given to 10 prepared bags. The results are expressed by a double circle when no bag is torn (=ideal for practical use), a circle when one or two bags are torn (=suitable for practical use) and in a cross when more than two bags are torn (=not suitable for practical use). As for the symbols used in the column of the total evaluation in Tables 1 and 2, a double circle means very good, a circle means good and a cross means poor.

Experimental Examples 2–11

The oriented monolayer splittable films of experimental examples 2–11 were produced by changing the mixture ratio of Ny66 and MXD6 in the above-mentioned experimental example 1 and the orientation ratio as shown in Table 1. Incidentally, the production method was the same as the above-mentioned experimental example 1. Also, the laminated splittable film based on each experimental example was produced by using an oriented film (a 15-micrometer thickness) as a base film for the surface and by dry-laminating it with each film as the sealant film shown in Table 2. Incidentally, the sealant film laminated on the base film in the experimental examples 2–9 was L-LDPE film with a thickness of 50 micrometers Also, the sealant film used in experimental example 10 was cast polypropylene (CPP) with a thickness of 60 micrometers. Moreover, the sealant film used in experimental example 11 was a film laminating PE film having a thickness of 20 micrometer with L-LDPE film having a thickness of 60 micrometer, wherein the oriented film is laminated on the side of the PE film. The laminated splittable film obtained in this way is made into a bag using a bag-making machine. As for the oriented film obtained by the conditions of the experimental examples 2–11, the measurement and evaluation of various features were made similar to that in experimental example 1, whose results are shown in Table 1. In Table 2, the ease in splitting and the ease in cutting the film straight of the laminated splittable film in experimental examples 2–11 are evaluated as well as those in experimental example 1. Also, the results of the strength against falling tests of the bags are shown.

Control Examples 1–8

The control examples 1–8 for the oriented monolayer film where the mixture ratio of Ny66 and MXD6 and the orientation ratio in the above-mentioned experimental example 1 was changed are shown in Table 3. Incidentally, the manufacturing process was the same as in experimental example 1. Also, laminated films in control examples 1–8 were obtained by using oriented film having a thickness of 15 micrometer as a base film and by further dry-laminating it with L-LDPE film with a thickness of 50 micrometer. The bags obtained in comparative examples 1–8 were produced by processing each laminated film in a bag making machine. The measurement and the evaluation of various characteristic were conducted as in experimental example 1 for each oriented film which was obtained under the conditions of control examples 1–8, the results of which are shown in Table 3. Also, in Table 4, the ease to split and the east to cut the film straight for the laminated films in the control examples 1–8 are evaluated the same as in experimental example 1. Also, the strength against falling tests in each of the bags were also conducted, which are shown in attached Table 4.

Consideration of experimental examples 1–11 and control examples 1–8 thereof.

The following items relate to Table 1. Because each oriented splittable monolayer film obtained under the conditions of experimental examples 1–11 contains Ny66 and MXD6 at a weight ratio of 40–85:60–15 and a biaxial orientation ratio during the production process of 2.8 and over, both in MD and TD directions, the split strength in each experimental result was 7.0 kg/cm and under and the ease in splitting is good or excellent. Also, the ease in cutting the film straight is considered sufficient. Moreover, each impact strength reading indicates 5000 kg*cm/cm and over, which is an excellent value. The laminated splittable films in Table 2 obtained under the conditions of experimental examples 1–11 have excellent ease in splitting even when in the form of bags. Also, the ease in cutting the film straight was good or very good. None or almost none of the bags were torn in the falling test and therefore it is recognized that the bags in experimental examples 1–11 had sufficient practical strength. The following items relate to Table 3. Through the oriented films based on control examples 1, 2 and 3 are within the intended range of the orientation ratio in the present invention, because Ny66 content is over 85 and MXD6 content is under 15 (including 0), the ease in cutting the film straight is insufficient though the impact strength is enough. Though the oriented films obtained under the conditions of control examples 4 and 5 have an orientation ratio within the range intended by the present invention, because Ny66 content is under 40 (including 0), and MXD6 content is over 60, the impact strength is insufficient though the ease in splitting and in cutting straight are good. Though the oriented films obtained under the conditions of control examples 6, 7 and 8 have the content of Ny66 and MXD6 within the range intended by the present invention, because the respective orientation ratios are smaller than the range of the present invention, the ease in splitting, the ease in cutting straight and the impact strength are poor. Table 4 shows that the practical use strength of the laminated films obtained under the conditions of control examples 1, 2 and 3 is enough because no bag was torn in the dropping test But, the ease in cutting straight is poor. The laminated films obtained under the conditions of control examples 4 and 5 have excellent ease in splitting and ease in cutting straight, but a considerable amount of bags were torn in the dropping test and the practical strength was poor. As for each of the laminated films obtained under the conditions of control examples 6, 7 and 8, at least one was bad with respect to the ease in tearing, the ease in cutting straight and the strength against falling.

Experimental Example 12

The raw material mixture which contains nylon 6-66 copolymer (Ny6 -66 ) and meta-xylylene adipamide (MXD6) at a weight ratio of 80:20 was kneaded and fused at a temperature of 260 degrees C in an extruder. After the fused material was extruded as the cylinder-like film from an accompanying dice with a diameter of 90 mm, it was rapidly cooled down with water and became a raw film 11. The used Ny6-66 was from nylon 6-66 copolymer which is produced by Ube Kosan (the tradename: UBE nylon 5023, the relative viscosity=3.6). As shown in FIG. 12, the raw film 11 obtained in -his way was simultaneously biaxially oriented by the same manufacturing process as in experimental example 1, wherein the orientation ratio was 3.0 in both directions of MD and TD. The oriented film was introduced into the heat treatment furnace based on the tenter method, and then heat-fixed at a temperature of 160 degrees C, whereby the oriented splittable film of this experimental example was obtained. This oriented film is the oriented monolayer splittable film By using this oriented film (a 15-micrometer thickness) as a base film for the surface and laminating this base film with L-LDPE film (tradename: Unilax LS-722C, a 50-micrometer thickness) as a sealable film according to the dry-laminate method, the laminated splittable film can be obtained A splittable bag is manufactured by this laminated splittable film using a bag-making machine. In the attached Tables 5 and 6, the measurement results of the split strength and the impact strength of the oriented film are shown. Also, the evaluation results of the ease in splitting and the ease in cutting straight are also shown. In Table 7, the ease in splitting and the ease in cutting straight the laminated splittable film are evaluated the same as for the oriented film. Moreover, the test of strength against falling for the bag was made for the purpose of evaluating practicality the same as experimental example 1. When measuring the shrinkage ratio of the oriented film, the result of MD direction / TD direction=30% / 29% was acquired. Also, the shrinkage ratio for the laminated splittable film in MD direction / TD direction =26% / 25%. Incidentally, the shrinkage ratio is calculated by an equation; (Δls/lo)×100% by determining the difference in lengths (Δls) between the length between marking lines drawn at a 10 cm interval on the surface of the film before heat treatment (lo) and the length between marking lines after the heat treatment at 95 degrees centigrade ls.

Experimental Examples 13–22

The oriented monolayer splittable film was produced through the same manufacturing steps as those in experimental example 12 by changing the mixing ratio of NY6-66 and MXD6 in experimental example 12 and the orientation ratio into that shown in Table 5. By using the oriented film (a 15-micrometer thickness) as a base film and laminating it with each film listed in Table 7 based on the dry-laminate method, it became the laminated splittable film obtained under the conditions of each experimental example. Incidentally, in experimental examples 13–20, the sealable film laminated with the base material film is L-LDPE film with a thickness of 50-micrometer Also, the sealable film which was used in experimental example 21 is EVA film with a thickness of 50-micrometers. More again, the film (but, an oriented splittable film is made the side of PE in the laminating) that PE was done in the laminating in a 20-micrometer thickness to L-LDPE film with a 60-micrometer thickness on the sealable film which is used in experimental example 22. By processing with a bag-making machine, the laminated splittable film obtained in this way is made into a splittable bag using the conditions of experimental examples 13–22. As for the oriented film made by the conditions of experimental examples 13–22, the measurement and the evaluation of various characteristics were made as in experimental example 12. Those results are shown in Table 5 and Table 6. Also, as for the oriented splittable film of experimental example 13–22, the splitability and ease in cutting straight were evaluated the same as in experimental example 12. The strength against falling test for the bag was also made. Those results are shown in attached Table 7. Incidentally, the shrinkage ratio of the oriented film obtained under the conditions of experimental example 15 was MD/TD=32%/30%. The shrinkage-ratio of the laminated splittable film obtained under the conditions of the same experimental example was MD/TD=28%/26%. Also, the shrinkage ratio of the oriented film obtained under the conditions of experimental example 17 was MD/TD= 33%/33%. The shrinkage ratio of the laminated splittable film obtained under the conditions of the same experimental example was MD/TD=29%/29%.

Control Examples 9–16

The oriented monolayer film which was obtained under the conditions of the control examples 9–16 was manufactured by the manufacturing process in experimental example 12 and by changing the rate of the mixing of Ny6 -66 and MXD6 in the above-mentioned example 12 and the orientation ratio as is shown in Table 8. The oriented film (a 15-micrometer thickness) obtained by the conditions of these control examples was used as a base film for the surface, and then laminated with L-LDPE film (a 50-micrometer thickness) as the sealable film based on the dry-laminate method. The laminated film obtained in this way was processed in a bag-making machine and made into a bag under the conditions of control examples 9–16. In Tables 8 and 9, the measurement results and evaluation of each feature of the oriented film obtained under the conditions of control examples 9–16 are shown as those of experimental example 12. In Table 10, the ease in splitting and in cutting straight of the laminated film obtained under the control examples 9–16 was evaluated as those in the experimental example 12. The test of strength against falling of the bag was made, too. The shrinkage ratio of the oriented film which was obtained under the conditions of control example 14 was MD/TD=29%/28% as the result of measurement. The percentage of shrinkage of the oriented film which was obtained under the conditions of control example 15 was MD/TD=31%/30%. Also, when the shrinkage ratio of the laminated film obtained under the conditions of control example 9 was measured, it was MD/TD=25%/23%. In the case of the laminated film obtained under the conditions of control example 10, it was HD/TD=27%/26%.

Consideration of experimental examples 12–22 and control examples 9–16 thereof.

The oriented splittable film in Tables 5 and 6 contains Ny6 -66 and MXD6 at a ratio of 40–85:60–15 and an orientation ratio when biaxially oriented of 2.8 and over, both in MD and TD directions, hence, the oriented splittable film obtained in any of the experimental example has an excellent split strength of 7.5 kg/cm and under. Also, it was found that the ease in cutting straight was good or very good. Also, as for the impact strength, a high impact strength of 6000 kg*cm/cm and over was acquired. From Table 7, the laminated splittable film obtained under the conditions of experimental example 12–22 has an excellent ease in splitting and good or very good ease in cutting straight. Also, in the falling test for the processed bag with the laminated splittable film, no or almost no bag was torn and the manufactured bag can be said to have sufficient practical strength. From the oriented film which is manufactured under the conditions shown in the control example 9–11 in Tables 8 and 9, against the above-mentioned result, the following can be considered. Though the orientation ratio was within the range intended by the present invention, the Ny6 -66 content was more than 85 and the MXD6 content was smaller than 15 (including 0), and as a result, the oriented film which was obtained under the conditions of these control examples had sufficient impact strength but the ease in cutting straight was inferior. Also, the following fact is considered from Table 10. Because for each laminated film which was obtained in control example 9–11, no bag was torn in the falling test, the practical strength was considered to be sufficient, but the ease in cutting straight was poor. As for each oriented film which was obtained under the conditions of control example 12, 13, though the orientation ratio was within the range intended by the present invention, because the Ny6 -66 content was smaller than 40 (including 0) and the MXD6 content was larger than 60, the impact strength was insufficient though the ease in splitting and the ease in cutting straight were good. As for each laminated film which was obtained under the conditions of control example 12, 13, the ease in splitting and the ease in cutting straight were good but the practical strength was insufficient because considerable bags were torn in the falling test As for each oriented film which was obtained under the conditions of control example 14–16, though Ny6 -66 and MXD6 contents were within the range intended by the present invention, because the orientation ratio was smaller than the range intended by the present invention, it was considered that the ease in splitting and ease in cutting straight and impact strength were not good. Each laminated film which was obtained under the conditions of control examples 9–16 has at least one quality of ease in splitting, ease in cutting straight and strength against falling was not good.

Experimental Example 23

The oriented splittable film prescribed by this experimental example was made as follows. The cylinder-like raw film 11 was made by kneading the raw material mixture which contains nylon 6 (Ny6 ) and meta-xylylene adipamide (MXD6) at a weight ratio of 60:40 during fusion at a temperature of 270 degrees C with an extruder (a 40 mm diameter), kneading ethylene-vinyl acetate copolymer saponification one (EVOH) during the fusion at a temperature of 220 degrees C with another extruder (a 30 mm diameter), extruding these fusion materials as a three-layer film of Ny6 +MXD6 /EVOH/Ny6 +MXD6 (a thickness ratio in the layer is 2:1:2) with a circular die with a diameter of 90 mm, and cooling it down with water rapidly. The structure is shown in FIG. 1 The used Ny6 is nylon 6 made by Ube Kosan Co. Ltd. (the tradename: UBE Nyron 1023 FD, the relative viscosity=3.6). Also, EVOH is an ethylene-vinyl acetate copolymer saponification one made by Kuraray Co. Ltd. (the tradename: Eval F, the ethylene content 32 mol %). Next, as is shown in FIG. 12, the raw film 11 was simultaneously biaxially oriented like experimental example 1 above. Incidentally, the orientation ratio was 3.0 both in the direction of MD and the direction of TD. The oriented film was made into an oriented monolayer splittable film by sending through the heat treatment furnace based on the tenter method, and was heat-fixed at a temperature of 210 degrees C. Also, the laminate splittable film prescribed by this experimental example was obtained as follows. The laminated splittable film prescribed by the present invention was obtained by using the oriented film (with the width of 15 micrometer) as a base film for the surface, and using L-LDPE film (the tradename Unilax LS-7 22C, thickness 50 micrometers) as a sealable film, and dry-laminating them A splittable bag can be produced when the laminated splittable film obtained in this way is processed by a bag-making machine. In attached Table 12, the results of the measurement of a split strength and an impact strength of the oriented splittable film obtained under the conditions of this experimental example and the results of an evaluation of the ease in splitting and ease in cutting straight are shown. Also, the results of an evaluation of the ease in splitting and the straight line cutting characteristic of the laminated splittable film of this experimental example are shown in Table 13. Also, the test of a strength against falling of a bag for evaluating the practicality of the laminate splittable film was made.

Experimental Examples 24–40

The oriented splittable film which is the object of these experimental examples was produced with the same mixing ratio of Ny6 and MXD6 as in example 23, the ethylene content of EVOH, the thickness ratio of the layers and the orientation ratio were changed as is shown in Table 11. Incidentally, the production method was the same as experimental example 23. In the table, the values for the 1st and 3rd layers in the column of raw material composition, show weight ratio. The value for the 2nd layer indicates ethylene content (mol %). The ethylene-vinyl acetate copolymer saponification one made by Kuraray Co., Ltd. (the tradename: Eval F, ethylene content 32 mol %, Eval L: 29 mol %, Eval H: 38 mol %, Eval E: 43 mol %) was used as EVOH. The laminated splittable film prescribed by these experimental examples was produced by using the oriented splittable film (a 15-micrometer thickness) as a base film for the surface and using each film listed in Table 13 as sealable films and then the films were dry-laminated. Incidentally, the sealable film which was used in experimental examples 24–38 was L-LDPE film with a 50-micrometer thickness. The sealable film which was used in experimental example 39 was EVA film with a 50-micrometer thickness. The sealable film which was used in experimental example 40 was a film in which PE was laminated with a thickness of 20 micrometer against the L-LDPE film having a 60-micrometer thickness (but the oriented splittable film was laminated on the PE side). A splittable bag was manufactured by processing laminated splittable film produced in this way in a bag-making machine. And, in Table 11, measurement and evaluation of various characteristics of an oriented splittable film with a 3-layer structure which was obtained under the conditions of experimental examples 24–40 are shown. Also, in Table 13, evaluation results of ease in splitting and ease in cutting straight of the laminated splittable film in experimental examples 24–40 and results of tests of strength against falling of the bag made of the laminated splittable film are shown. When the gas barrier quality of the oriented splittable film prescribed in the experimental example was measured, for oxygen penetration degree (cc/m2 24 Hr), in experimental example 26, it was 0.79, in experimental example 33, it was 0.48, in experimental example 34, it was 0.31, and in experimental example 35, it was 2.06. When the gas barrier quality of the laminated splittable film was measured, the oxygen penetration degree (cc/m2 24 Hr) was 0.79 in experimental example 26, 0.48 in experimental example 33, 0.31 in experimental example 34, 2.06 in experimental example 35, and 6.14 in experimental example 36. The oxygen penetration testing machine made by Mocon Co. Ltd. was used to measure the degree of oxygen penetration. Incidentally, the measurement temperature was 23 degrees C and the measurement relative humidity was 0%.

Control Examples 17–30

Each orientation film manufactured in these control examples was manufactured by the manufacturing process of experimental example 23 and the conditions, i.e. mixing ratio of Ny6 and MXD6 , ethylene content of EVOH, the thickness ratio of the layers and the orientation ratio of experimental example 23 were changed as are shown in Table 14. The ethylene-vinyl acetate copolymer saponification one was made by Kuraray Co. Ltd. (the tradename: Eval F, ethylene content 32% mol, Eval H: 38 mol %). The laminated film of these control examples was produced by using oriented film in each control example (with the width of 15 micrometer) as a base material film for the surface, and laminating with sealable film for each laminated film in Table 16 by the dry-laminating method. Incidentally, the sealable film which was used in these control examples was L-LDPE film with a 50-micrometer thickness. The laminated film obtained in this way was made into a bag with a bag-making machine. In Tables 14 and 15, the measurement of various features and evaluation results of oriented film obtained under the conditions of control examples 17–30 are indicated. Also, in FIG. 16, the evaluation result of ease in splitting and ease in cutting straight of the laminated film in control examples 17–30 are indicated. Moreover, the result of the test of strength against falling is also indicated. When the gas barrier quality of the film was measured, the oxygen penetration degree (cc/m2 24 Hr) was 1.56 in control example 17, 0.30 in control example 23, and 61.0 in control example 24. when the gas barrier quality of the laminate film was measured, the oxygen penetration degree (cc/m2 24 Hr)

was 1.56 in experimental example 17, 0.30 in experimental example 23, 61.0 in experimental example 24, 2.06 in experimental example 35, and 6.14 in experimental example 36.

Consideration of experimental examples 23–40 and control examples 17–30.

The oriented splittable film obtained under the conditions of experimental examples 23–40 had the 1st layer containing nylon 6 (Ny6 ) and meta-xylylene adipamide (MXD6) at a weight ratio of 40–85:60–15 and the 2nd layer comprising ethylene-vinyl acetate copolymer saponification one (EVOH). Incidentally, the thickness ratio of the 1st layer and the 2nd layer was 2:1–1:2 and the orientation ratio of the film during biaxial orientation was 2.8 and over both in MD and TD directions. From Tables 11 and 12, it is judged that the oriented splittable films obtained in these ways have excellent ease in splitting with a split strength of 8.9 kg/cm and under and their ease in cutting straight is good or very good. Also, their impact strength indicates a high value of 5000 kg*cm/cm and over. Also, it is considered that the laminated splittable film shown in Table 13 obtained under the conditions of experimental examples 23–40 has excellent ease in splitting and good or very good ease in cutting straight. Because in the falling test for bags made of the laminated splittable film in each embodiment, none or almost no bag was torn, they are considered to have sufficient practical strength. On the other hand, the following facts are considered from Tables 14 and 15. First, the oriented film which was obtained under the conditions of control examples 17–20 meets the condition intended by the present invention but because it has no first layer containing Ny6 and MXD6 as in the present invention, even if the impact strength is sufficient, the split strength is large and the ease in splitting and the ease in cutting straight are inferior. Though the oriented film which was obtained under the conditions of control examples 21, 22 had a layer containing Ny6 and MXD6 , the ingredient rate was not in the range intended by the present invention, wherein the split strength is large and the ease in cutting straight is inferior. Incidentally, as is shown in control example 22, when the ingredient ratio of MXD6 is too large, the impact strength is inferior. The oriented film which was obtained under the conditions of control example 23–25 is a simple substance film. In other words, because it was not made of the combination of the 1st layer and the 2nd layer, and one of split strength, ease in cutting straight, and impact strength is inferior. Though the oriented film which was obtained under the conditions of control examples 26–28 had the 1st layer and the 2nd layer, because the orientation ratio doesn't reach the range intended by the present invention, any one of split strength, ease in cutting straight, and impact strength is inferior. Though the oriented film which was obtained under the conditions of control examples 26–28 had a 1st layer and a 2nd layer, because the thickness ratio of each layer was out of the range intended by the present invention, any one of split strength, ease in cutting straight, and the impact strength is inferior. Also, the following facts are considered from Table 16. As for the laminated film which was obtained under the conditions of control examples 17–20, no bag was torn in the falling test and the practical strength is sufficient, but ease in splitting and ease in cutting straight are inferior. As for the laminated film which was obtained under the conditions of control examples 21, 22, the ease in splitting and ease in cutting straight are inferior. Also, as for control example 22, considerable bags were torn in the falling test. As for each laminated film which was obtained under the conditions of control examples 23–25, at least one of ease in splitting, ease in cutting straight and the strength against falling is inferior. As for the laminated film which was obtained under the conditions of control examples 26–28, at least two of ease in splitting, ease in cutting straight, and strength against falling are inferior. As for the laminated film which was obtained under the conditions of control examples 29, 30, at least one of the ease in splitting, ease in cutting straight and the strength against falling is inferior.

Experimental Example 41

Figure 3:
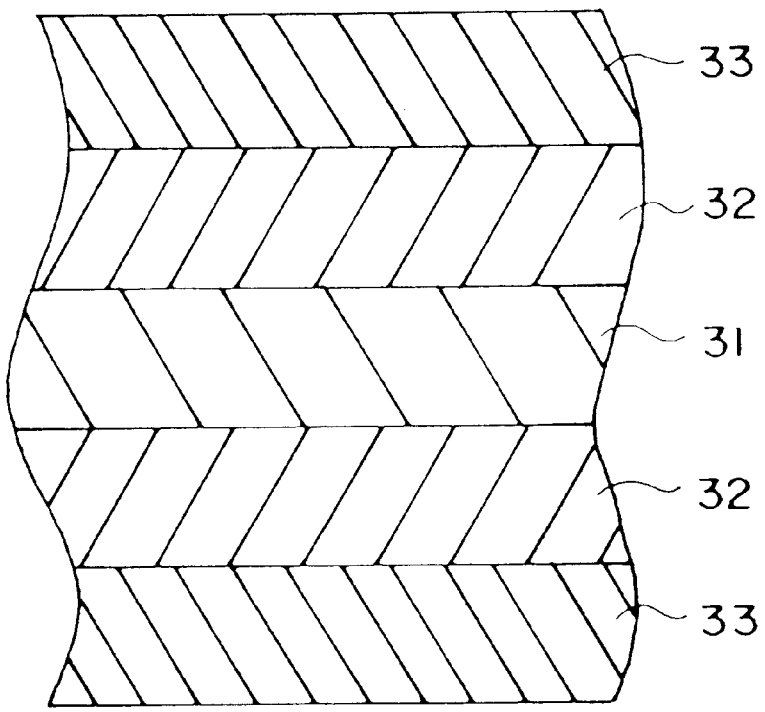
Figure 4:
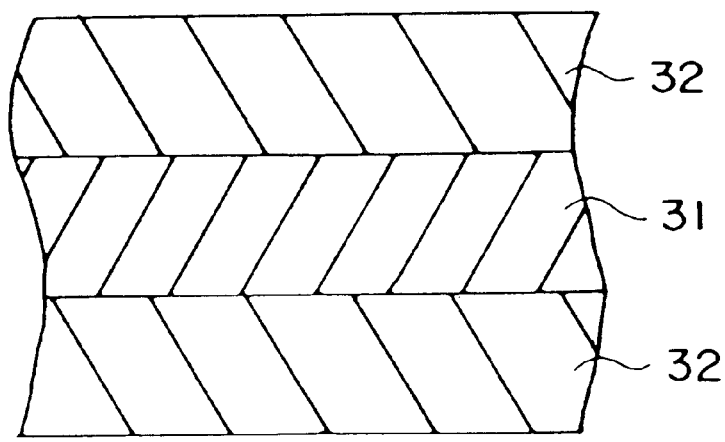
Figure 5:
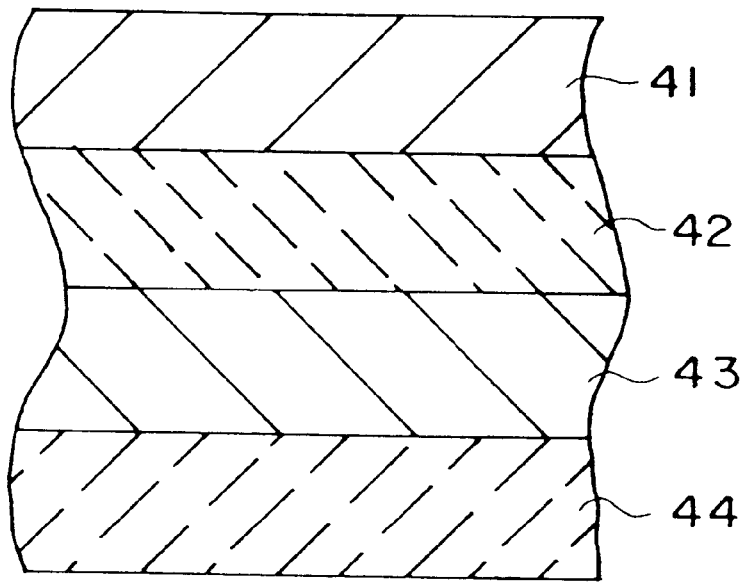
Figure 6:
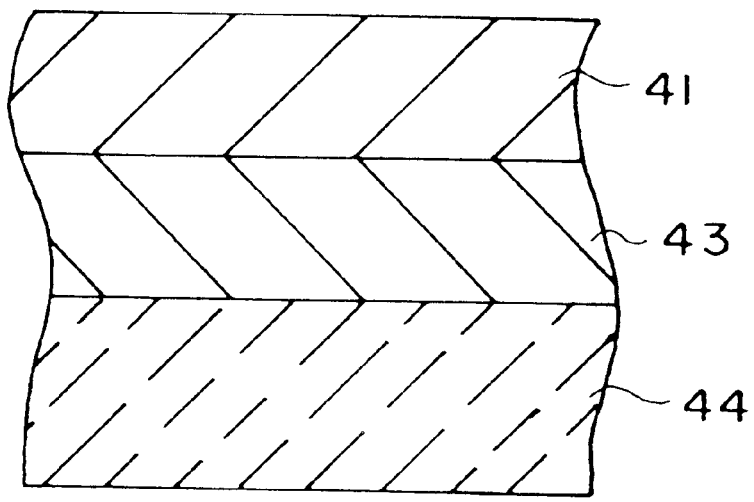
Figure 7:
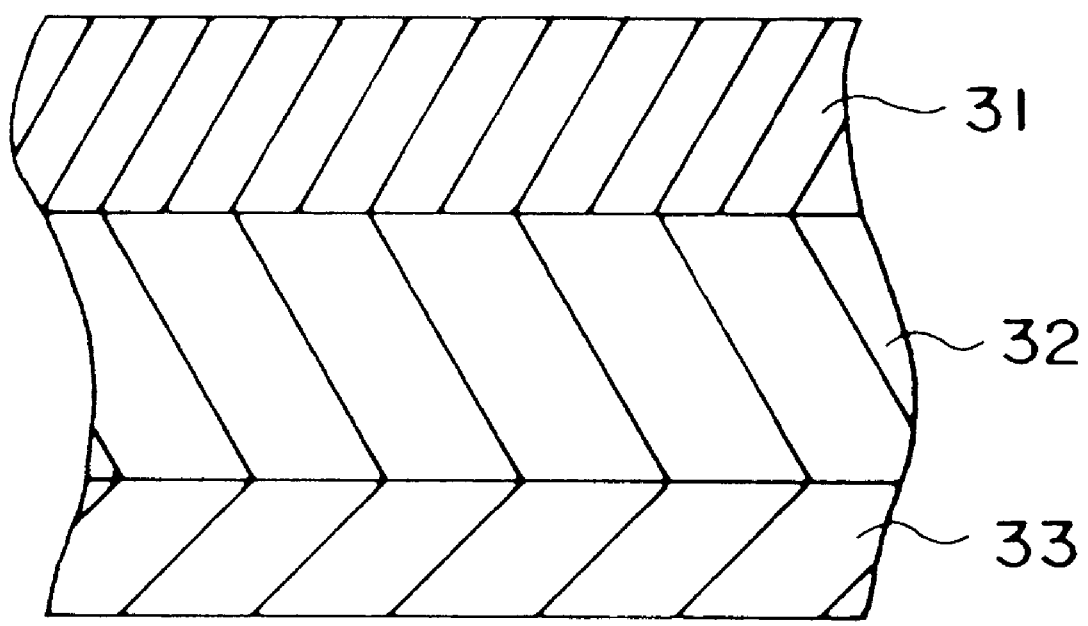
Figure 8:
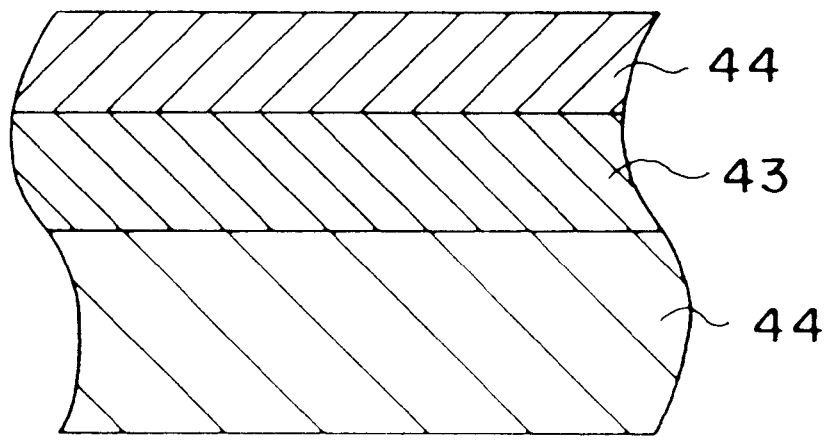
Figure 9:
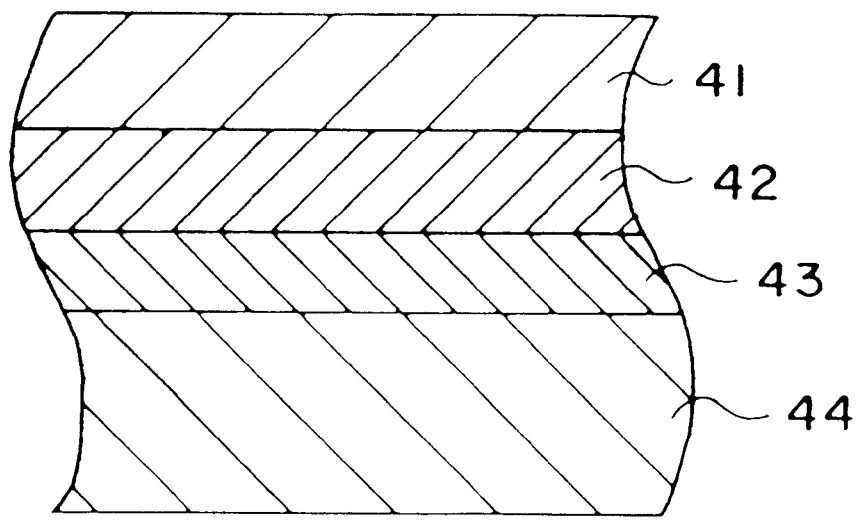

An oriented splittable film in this experimental example comprises three layers and it is produced by the steps mentioned below. A raw material mixture containing Ny6 and MXD6 at a weight ratio of 95:5 was used in the 1st layer. A raw material mixture containing Ny6 and MXD6 at a weight ratio of 40:60 was used in the 2nd layer. A raw material mixture containing Ny6 and MXD6 at a weight ratio of 95:5 was used in the 3rd layer. The three types of raw material mixtures mentioned above were delivered to three extruders (with a diameter of 40 mm) respectively, after being kneaded and fused at a temperature of 270 degrees centigrade, that were extruded from a multi-layer circular die with a diameter of 90 mm in 3 layers i.e., 1st/2nd/3rd layer (the thickness ratio=1:2:1), and then cooled down with water. In this manner, first, the cylinder-like raw film 11 was manufactured. The layer structure of this film is shown in FIG. 7. Next, this raw film 11 was simultaneously biaxially oriented as in experimental example 1 (See FIG. 12). Incidentally, the ratio of the biaxial orientation was 3.0 both in the MD and TD directions. The biaxial oriented film was made into the oriented splittable film having a monolayer prescribed by this experimental example by sending through a heat treatment furnace and heat-fixing at a temperature of 210 degrees centigrade. Also, the laminated splittable film prescribed by this experimental example was obtained by using, the oriented splittable film (a 15-micrometer thickness) of this experimental example as a base material film for the surface and laminating it with L-LDPE film (tradename: Unilax LS-722C, thickness of 50 micrometers) as a sealable film by the dry-laminating method. The oriented splittable film obtained in this manner was made into a splittable bag. In the attached Table 18, the result of the measurement of split strength and impact strength of the oriented splittable film and the result of the evaluation of ease in splitting and ease in cutting straight are shown. Also, in the Table 19, the result of the evaluation of ease in splitting and ease in cutting straight is shown. In the same table, the test result of strength against falling for evaluating practicality of the bag made of the laminated splittable film of this experimental example is shown.

Experimental Example 42–59

The rate of the mixing of NY6 and MXD6 in the 1st-3rd layer of the above mentioned experimental example 41, the thickness ratio of the layer and the orientation ratio were changed as shown in Table 17 and experimental examples 42–59 were manufactured by the manufacturing steps of experimental example 41. Also, the laminate splittable film was produced by using this oriented splittable film (a 15-micrometer thickness) as a base material film for the surface and laminating it with each sealable film shown in Table 19 by the dry-laminate method. Incidentally, the sealable film used in experimental example 42–59 was L-LDPE film with a 50-micrometer thickness. The sealable film used in experimental example 56 was EVA film with a 50-micrometer thickness. The sealable film used in experimental example 57 was PP having a 60-micrometer thickness without orienting. The sealable film used in experimental example 58 was a film with PE laminated with a thickness of 20 micrometer against the L-LDPE film with a thickness of 60 micrometer (an oriented splittable film was laminated on the PE side). The sealable film used in experimental example 59 was L-LDPE film with a 80-micrometer thickness. The laminated film obtained in this manner was made into a splittable bag by processing in a bag-making machine. In Table 18, the measurement and the evaluation of various characteristics of the oriented splittable film obtained in experimental examples 42–59 were made like in experimental example 41. Also, in Table 19, the results of the evaluation of the ease in splitting and ease in cutting straight of the laminated splittable film in experimental examples 42–59 and results of the tests for strength against falling for bags made of the laminated splittable film are also shown.

Control Examples 31–41

The mixing ratio of Ny6 and MXD6 in the 1st to 3rd layers of above-mentioned experimental example 41, the thickness ratio of the layers, and the orientation ratios of each oriented film prescribed in these control examples were changed as indicated in Table 20 and they were produced by the same manufacturing steps as experimental example 41. Also, the laminated film was produced by using the oriented film (a 15-micrometer thickness) which was obtained under the conditions of control examples 31–41 as a surface base material film and by laminating it with each sealable film shown in Table 22 by the dry laminate method. Incidentally, the sealable film used in control examples 31–41 was L-LDPE film with a 50-micrometer thickness. Also, the laminated film obtained in this way was made into a splittable bag in these control examples by processing in a bag-making machine As for the oriented film which was obtained under the conditions of control examples 31–41, the measurement and the evaluation of various characteristics were made as in experimental example 41, which results are shown in Table 21. Also, in attached Table 22, the ease in splitting and the ease in cutting straight of the laminated film in control examples 31–41 was evaluated as in experimental example 41. Also, the results of the examination of strength against falling for the bags are indicated.

Consideration of experimental examples 41–59 and control examples 31–41.

Tables 18 and 19 show that any of the oriented splittable films which were obtained under the conditions of experimental examples 41–59 have 7.0 kg/cm and under for split strengths, excellent ease in splitting and good or very good ease in cutting straight Also, the impact strength is 6500 kg*cm/cm and over, which is very high. Table 19 shows that the laminated splittable film which was obtained under the condition of experimental examples 41–59 has an excellent ease in splitting and very good or good ease in cutting straight and also; almost none or no bags were torn in the falling test when the laminated splittable film was made into bags, so it has sufficient practical strength On the other hand, in Tables 20 and 21, because the oriented film which was obtained under the conditions of control example 31 and 32 is a monolayer film comprised only of Ny6 , a split strength is big and the ease in cutting straight is inferior The oriented film which was obtained under the conditions of control example 33 is inferior in ease in cutting straight because it is a monolayer having a MXD6 content of 10%. Because the oriented film which was obtained under the conditions of control example 34 was a monolayer film comprising MXD6 , an impact strength was bad. Though the oriented film which was obtained under the conditions of control examples 35–37 had the 1st and 3rd layers, because the content rate of Ny6 and MXD6 in these layers was out of the range intended by this invention, the ease in cutting straight is inferior. Though the oriented film which was obtained under the conditions of control example 38 had the 1st and 3rd layers, because the content rate of Ny6 and MXD6 in these layers was out of the range intended by this invention and the thickness ratio of the layers was out of the range intended by the present invention, the ease in cutting straight and ease in splitting are inferior.

Though the oriented film which was obtained under the conditions of control examples 39–41 had a content rate of Ny6 and MXD6 in the 1st-3rd layers within the range intended by this invention and the thickness ratio of the 1st to 3rd layers was within the range intended by the present invention, because the orientation ratio during biaxial orientation was smaller then 2.8 in MD and TD directions, at least one of split strength, ease in cutting straight and the impact strength is inferior. Also, from Table 22, it is considered that at least one of ease in splitting, ease in cutting straight and the strength against falling of the laminated film obtained under the conditions of control examples 31–41 is inferior.

Experimental Example 60

The oriented splittable film which is prescribed by this experimental example was manufactured by the following method. The raw material mixture which contains Ny6 and MXD6 at the rate of 80:20 is supplied to the extruder and fused and kneaded at a temperature of 270 degrees C. After that, it was pressed into a film in the form of a circular cylinder from a die with diameter of 90 mm, then, it was quickly cooled with water so that it almost became a raw film. This raw film 11 was biaxially oriented at the same time as the experimental example 1 (see FIG. 12). The magnification of the biaxial orientation in both directions of HD and TD was 3.0 times. The biaxially oriented film was sent to a heat treatment furnace, based on the tenter method and thermally fixed at a temperature of 210 degrees C. Then, it became an oriented splittable film prescribed by this experimental example. The laminated splittable film in this experimental example had a 3-layer structure; L-LDPE film as a sealable film for the first layer (Unilax LS-722C (tradename) e thickness of 50-micrometer, oriented splittable films as the second layer and the third layer (both thickness is 15 micrometers respectively). The laminated splittable film was manufactured by dry laminating three layers. Also, splittable bags were manufactured by processing this laminated splittable film with a bag manufacturing device. Attached Table 23 shows an ease in cutting straight for the oriented splittable film prescribed by this experimental example and a result of the evaluation of split resistance Incidentally, the split resistance was evaluated from split conditions of the film in the case of an ease in cutting straight examination. That is, the evaluation was marked with a double circle for film which was smoothly cut to the end, a circle for film which was once stopped but cut to the end, and a cross for film which was once stopped and could not be cut.

Experimental Examples 61–67

An oriented splittable film was made the same as in experimental example 60. After that, a laminated splittable film having a 3-layer or 4-layer structure which was made under the conditions of experimental examples 61–67, was obtained by dry-laminating each film shown in Table 23. A sealable film for the first layer (L-LDPE, CPP), an oriented film for the second layer, and each film shown in Table 23 had base films for the third layer and the fourth layer (ONy, PET, OPP). Incidentally, experimental examples 61–63, 66, 67, correspond to the 3-layer structure shown in FIG. 10, experimental examples 64–65 correspond to the 4-layer structure shown in FIG. 11. Incidentally, N-M in the Table shows the oriented splittable film of this invention, L-LDPE shows the linear chain low density polyethylene, ONy shows a biaxial orientation nylon film and CPP shows a non-orienting polypropylene film. Next, using each laminated splittable film, a splittable bag was manufactured with a bag manufacturing device so that the sealable film became the inner layer. The laminated splittable film which was obtained under the conditions of experimental examples 61–67 was evaluated for the ease in cutting straight and the split resistance as in experimental example 60. Those results are shown in Table 23.

Control Examples 42–48

Figure 10:
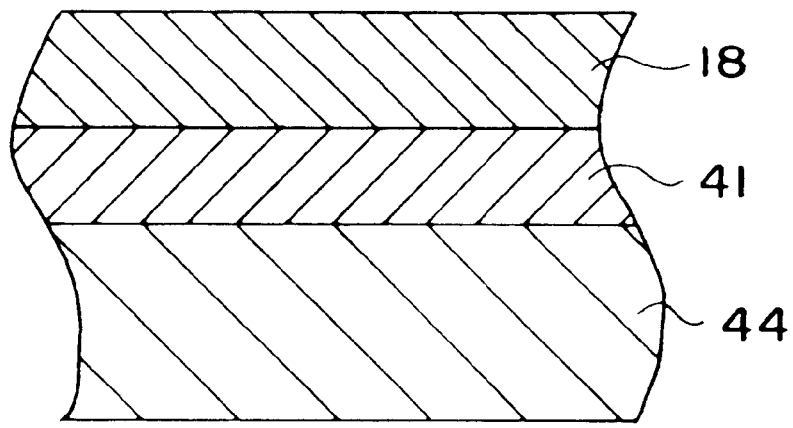
Figure 11:
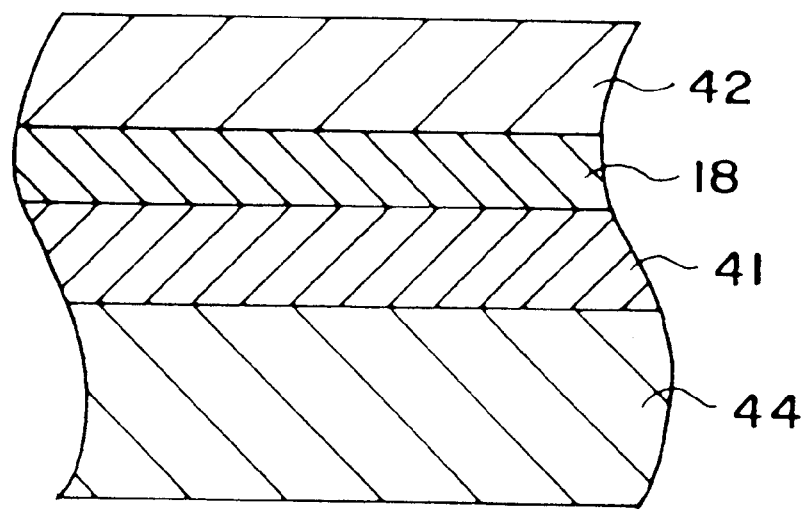

The laminate films with 3-layer or 4-layer structure in these control examples were made by making an oriented film as in experimental example 60, and dry laminating each film which is shown in Table 23 under the conditions shown in FIGS. 10, 11, where the oriented film 18 is not adjacent to the sealable film 44 of the first layer, that is, one or more layer of base material films 41, 42 can be put between oriented film 18 and sealable film 44. Incidentally, in the case of control examples 46–48, laminated films with 3-layer or 4-layer structures were obtained instead of using an oriented film For each laminated film, a bag which relates to these control examples was manufactured by a bag manufacturing device so that a sealable film became the inner layer. The laminated film which was obtained under the condition of control examples 42–48 was evaluated for ease in cutting straight and split resistance as in experimental example 60. Those results are shown in Table 23.

Consideration of experimental examples 60–67 and control examples 42–48.

According to Table 23 and experimental examples 60–67, a laminated splittable film whose layers were laminated with an oriented splittable film and a sealable film adjacent to each other, favorable ease in cutting straight, which is inherent in an oriented splittable film, and small split resistance were certainly obtained in any of the laminated splittable films. On the other hand, in control examples 42–45, since an oriented film was contained in the laminated film, favorable ease in cutting straight and small split resistance are obtained. However, since the oriented film and the sealant film were not adjacent to each other, more favorable ease in cutting straight and small split resistance were not obtained as in experimental examples 60–67. According to the control examples 46–48, since an oriented film was not contained in the laminated film, at least one of ease in cutting straight and split resistance was poor.

Experimental Example 68

After a raw material mixture which contained Ny6 and MXD6 at a ratio of 60:40 was fused and kneaded with a biaxial kneading machine Ciade by Ikegai Tekko Co., Ltd. ejection quantity: 30 kg/Hn, a resin pellet was made. The resin temperature in this fusion kneading was 275 degrees C. A resin pellet was fused and kneaded in an extruder diameter of 40 mm at 270 degrees C, and the fusion kneaded material was extruded from a die with a diameter of 90 mm as a film in the form of a circular cylinder. Then, raw film 11 was continuously made by sudden cooling with water. Next, as shown in FIG. 12, this raw film 11 was biaxially oriented at the same time as experimental example 1. The magnification in this orienting was 3.0 times for direction of MD and 3.5 times for direction of TD. In the biaxial orientation, bubble 16 was stable and produced a good forming stability Next, the film was inserted in tenter formula heat treatment furnace and thermally fixed at 210 degrees C, then, an oriented splittable film which was made under the conditions of this experimental example was obtained. Next, the wall thickness precision and strength against impact of the oriented splittable film were measured and evaluated, and the ease in cutting straight was evaluated. The results are shown in attached Tables 24, 25. The wall thickness precision was calculated by measuring the thickness at 5 mm intervals in the direction of the circumference (TD) of the raw film, finding the maximum and minimum values, and calculating $\alpha$=(maximum−minimum) / average×100 using the whole average. The results are shown in Tables 24 and 25 with a circle if the value $\alpha$ is ±6% or less, with a triangle for ±6%<$\alpha$<±9%, and a cross if $\alpha$ is 9% or more.

Experimental Examples 69–73

In the above experimental example 68, the mixing ratio between Ny6 and MXD6 , and the resin temperature in fusion kneading before extruding was changed as shown in Table 24. The oriented splittable film which was obtained under the conditions of experimental examples 69–73 was obtained by a similar manufacturing process as in experimental example 68. A forming stability at the time of biaxial orientation of the film obtained under the conditions of experimental example 69–73 was evaluated, and various characteristics were measured and evaluated as in experimental example 68. Those results are shown in Tables 24, 25. Incidentally, in the column for the stability in the orientation forming shown in Table 24, a circle indicates good forming stability and a cross indicates poor forming stability.

Control Examples 49–52

In the above experimental example 68, the mixing ratio between Ny6 and MXD6 was changed as shown in Table 24, the film which was obtained under the conditions of control examples 49–52 and was obtained in a similar manufacturing process as experimental example 68. But, only in control example 51 was fusion kneading carried out before extrusion forming In control examples 49, 50, dry blending, rather than fusion kneading, was executed before extrusion forming, and in control example 52 there was no kneading before the extrusion forming. Orienting moldability, at the time of the biaxial orientation, for the film which was obtained under the conditions of control examples 49–52 was evaluated Also, various other characteristics were measured and evaluated for experimental example 68. Those results are shown in Tables 24, 25.

Consideration of experimental examples 68–73 and control examples 49–52.

According to Tables 24, 25 and experimental examples 68–73, by providing a process which fuses and kneads a mixture of Ny6 and MXD6 at 300 degrees C or less, before fusion extrusion, with an extruder, the forming stability at the time of biaxial orientation becomes good and wall thickness precision of the obtained splittable film becomes good. Therefore, a product with a good wound figure can be obtained according to experimental examples 68–73. The problems in secondary manufacture do not occur, such as a pitch difference that occurs in polychrome, and so-called tunneling (inclusion of air between films) which occurs in the case of laminate Also, even if a fusion kneading manufacturing process before such an extrusion is added in the manufacturing process of a splittable film, the strength against impact and the ease in cutting straight for the obtained splittable film aren't influenced and remain good. On the other hand, according to control examples 49, 50, since the dry blend was carried out instead of fusion kneading before extrusion forming, wall thickness precision of the obtained film was poor. According to control example 51, in which there was fusion kneading before extrusion forming, the resin temperature at that time exceeded 300 degrees C, so that forming stability at the time of the biaxial orientation was poor and strength against impact and an ease in cutting straight for the obtained film was poor. According to control example 52, kneading before extrusion forming was not carried out so that wall thickness precision of the obtained film was poor and the ease in cutting straight was also poor.

Experimental Example 74

Figure 14:
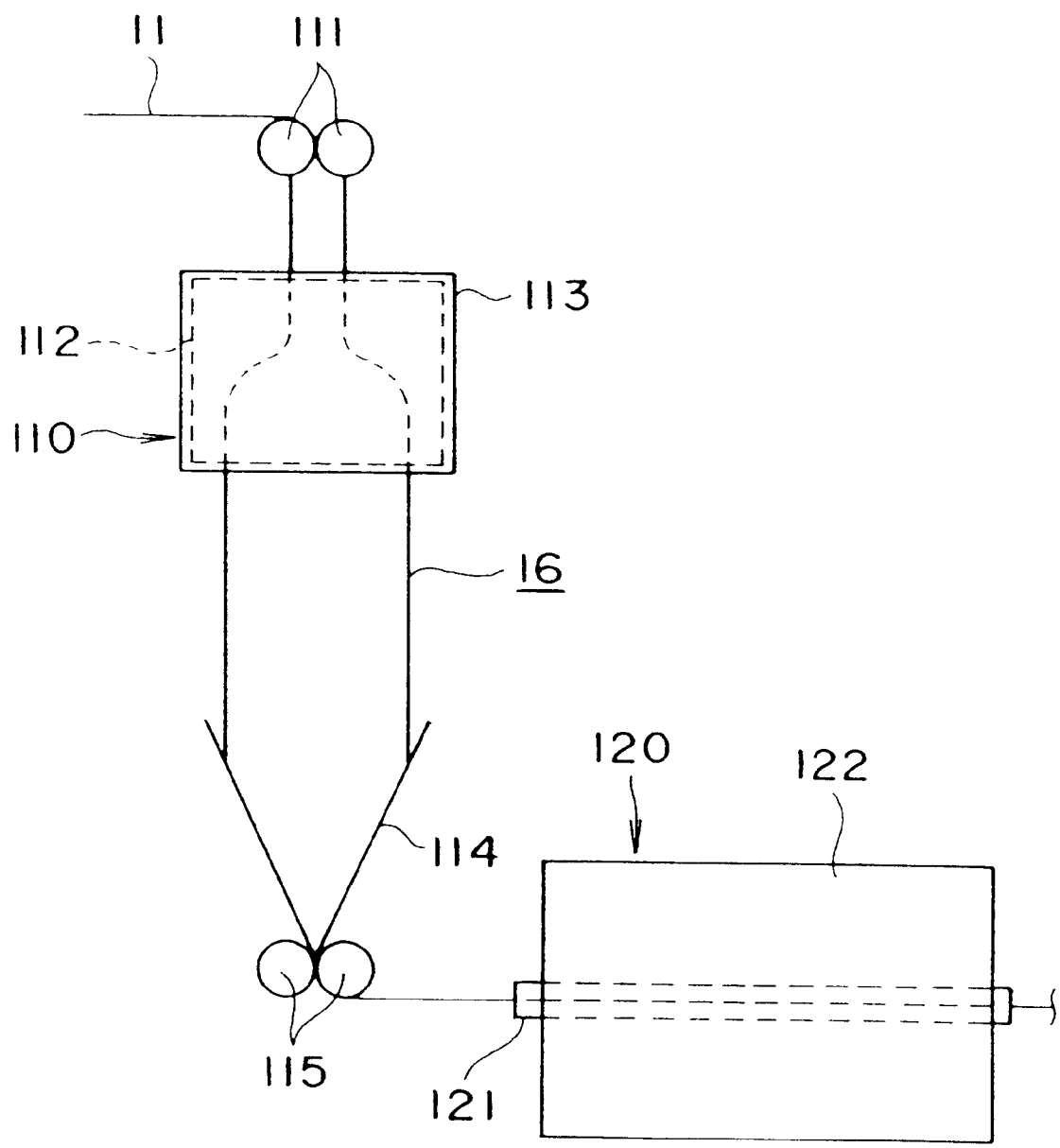
FIGS. 14 and 15 are schematic views which show equipment of another production method for the oriented splittable film.
Figure 15:
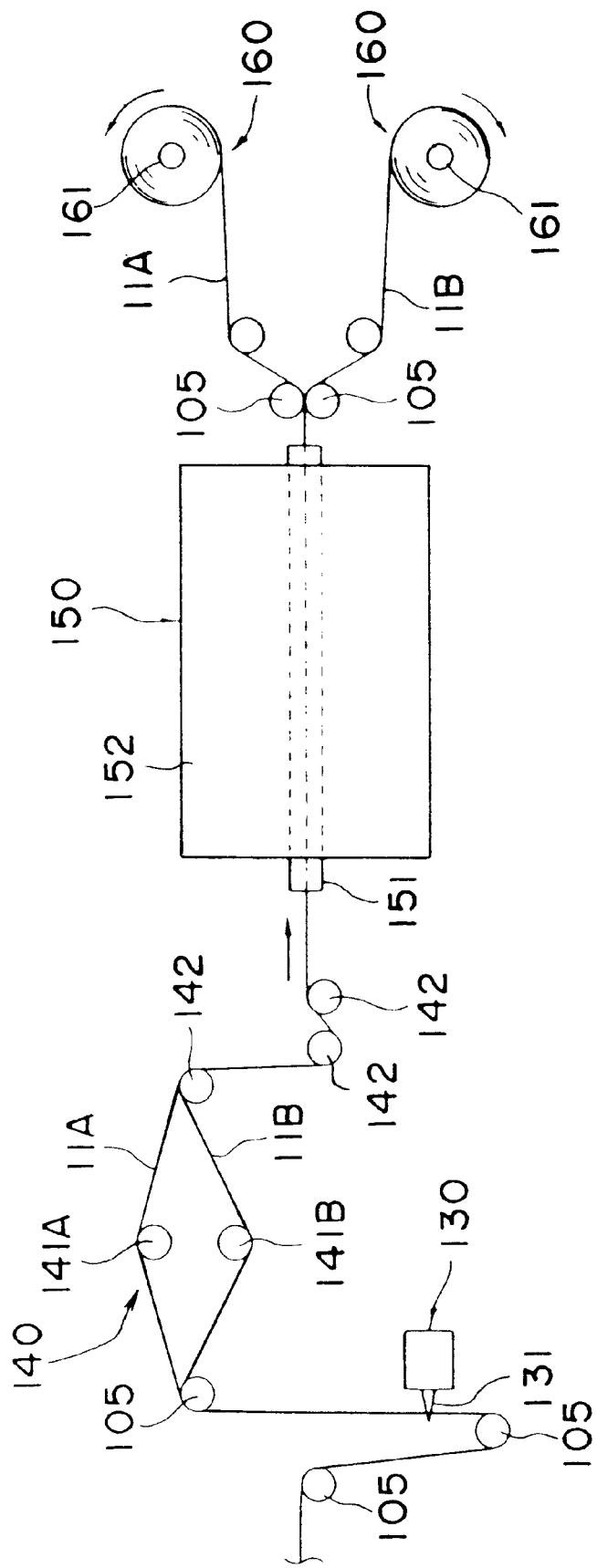
Figure 16:
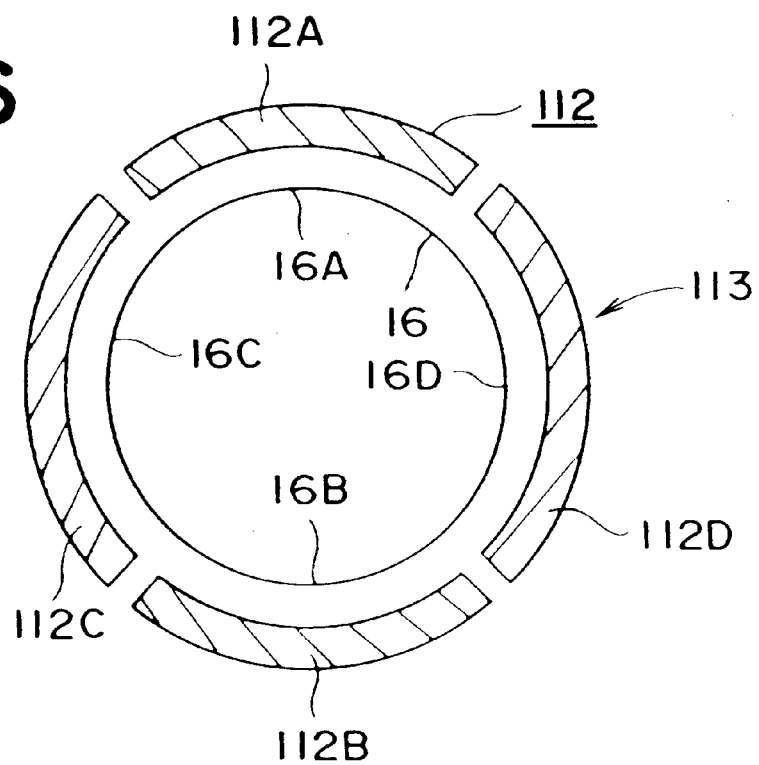
FIG. 16 is a plane cross sectional view which shows a heating arrangement of heaters used in the production method of the oriented splittable film.
Figure 17:
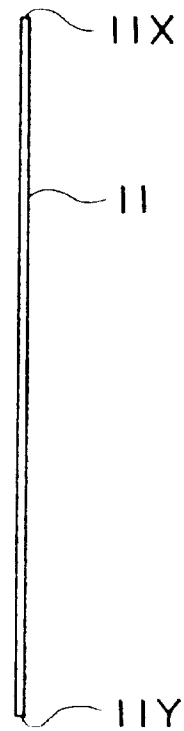
FIG. 17 is a plane cross sectional view which shows a folded bubble in the production method for the oriented splittable film.
Figure 18:
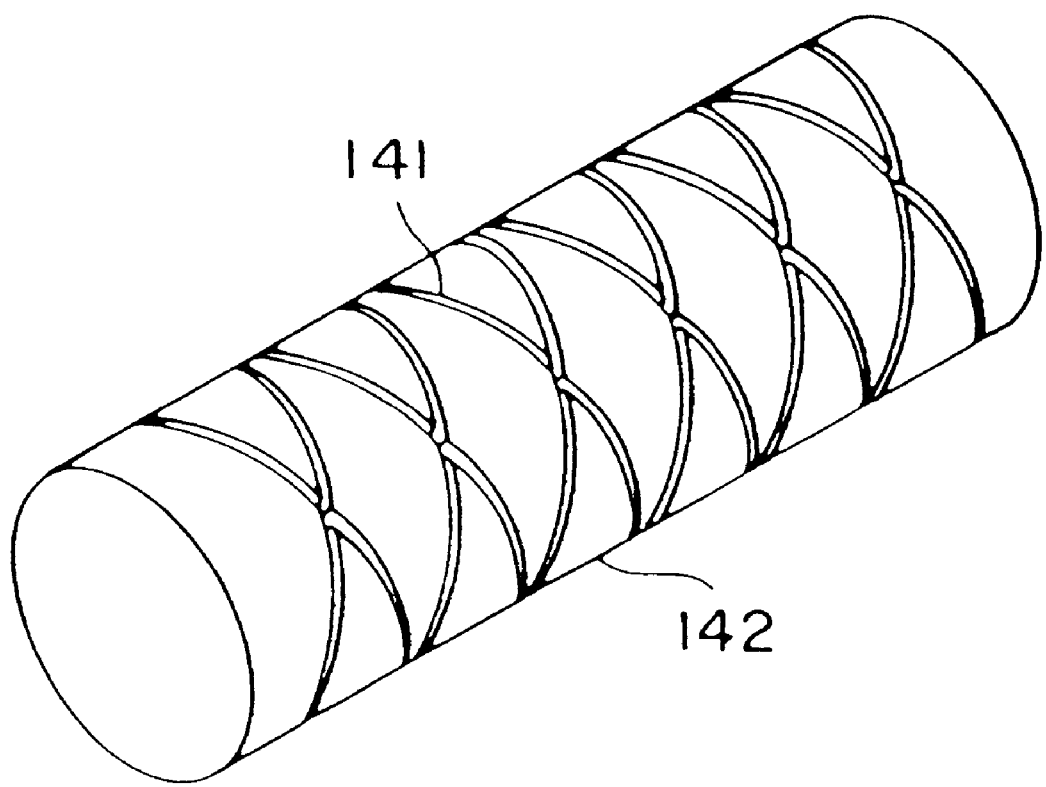
FIG. 18 is a schematic diagram which shows a roller with grooves used in the production method for the oriented splittable film.
Figure 19:
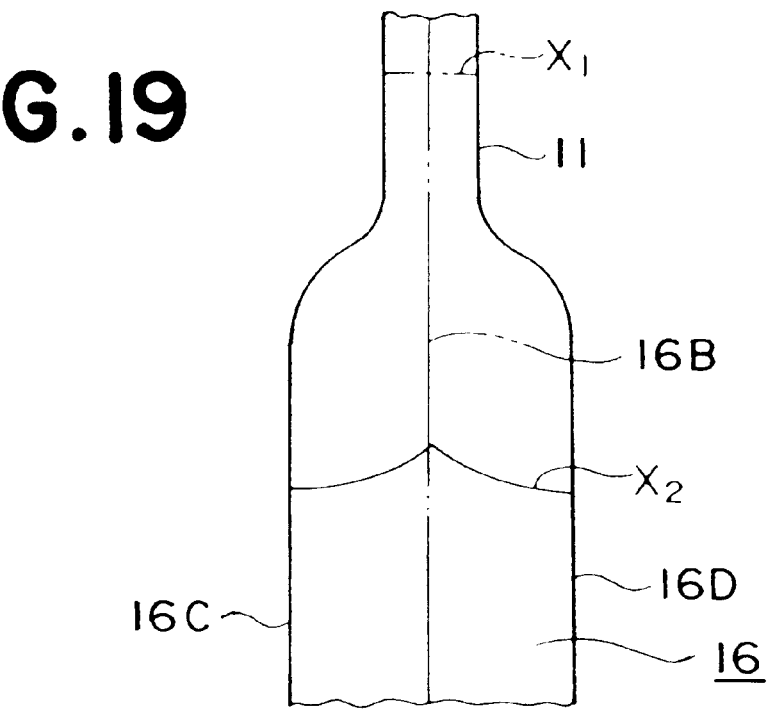
FIG. 19 is a side-view which shows a bowing phenomenon in the reversed direction during biaxial orientation.
Figure 20:
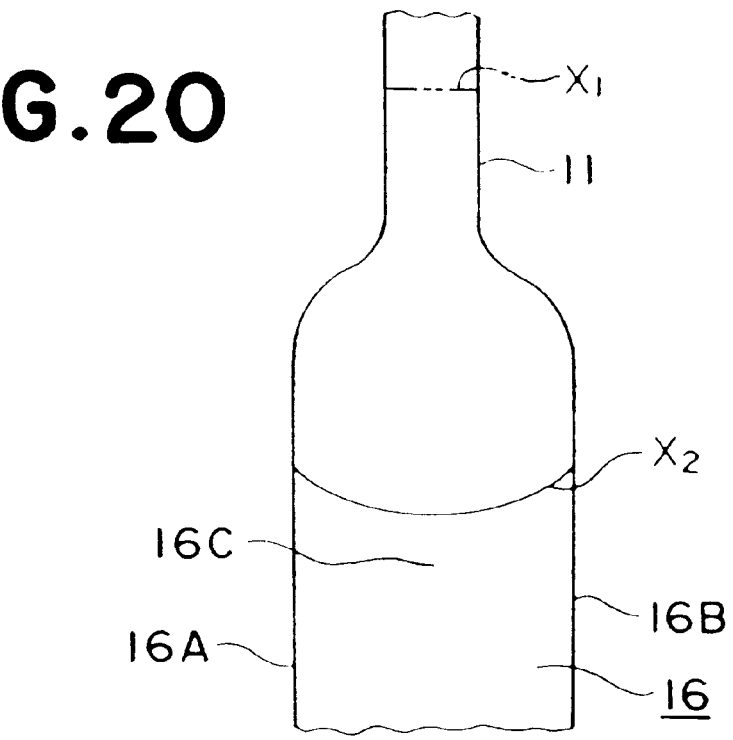
FIG. 20 is a front view which shows a bowing phenomenon in the reversed direction during biaxial orientation.
Figure 21A:
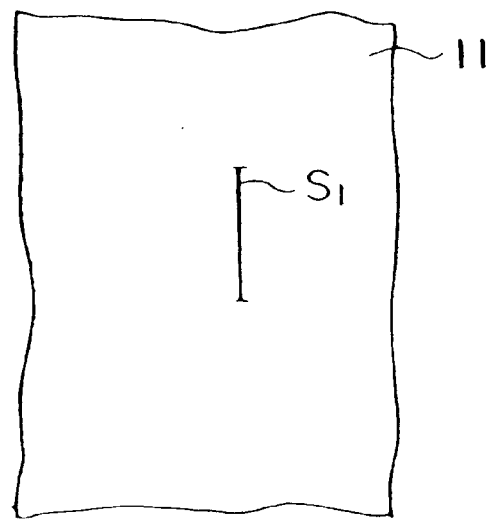
FIG. 21(A) and FIG. 21(B) are front views which show a measuring method of the bowing ratio.
Figure 21B:
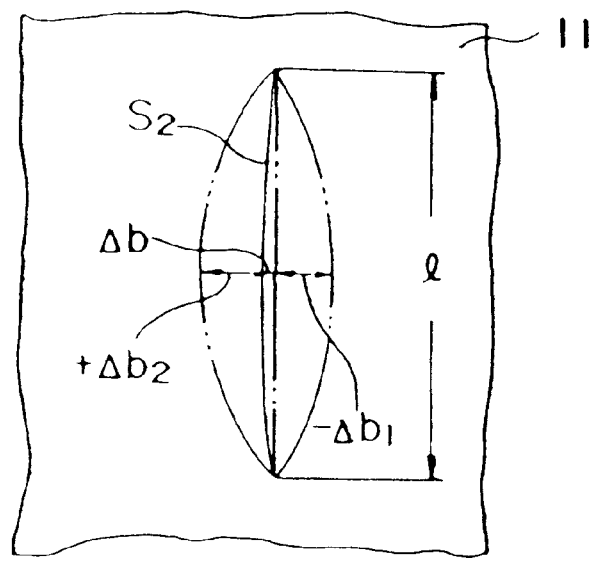
Figure 22:
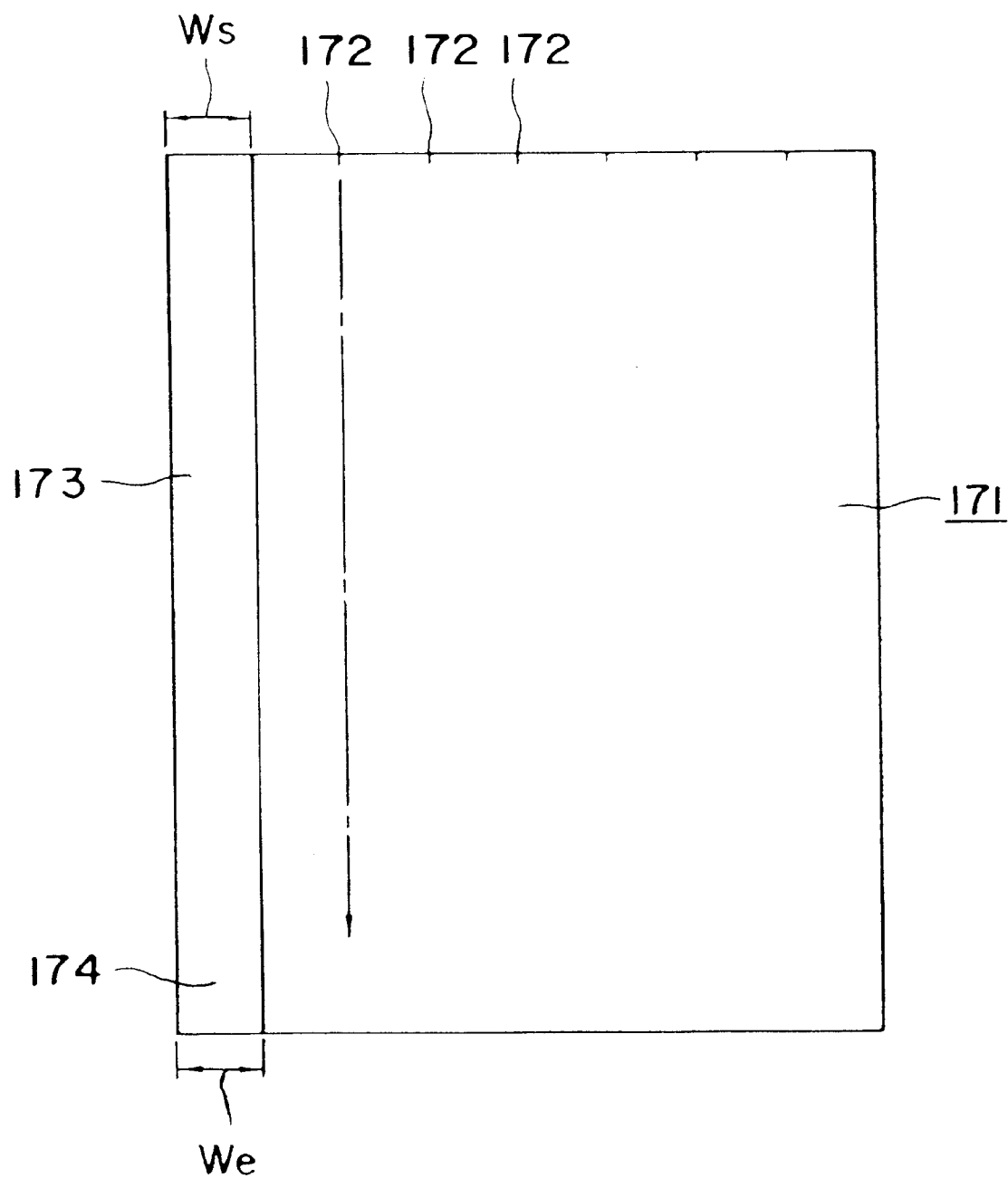
FIG. 22 is a view which shows a way of evaluating the ease in cutting the film straight.

The manufacturing equipment used in experimental examples 74–80 is explained in the drawings As shown in FIGS. 14, 15, the manufacture equipment is equipped with the following: equipment 110 is to biaxially orient raw film 11 by the tubular method; first the heating equipment 120 for thermally processing the film 11 by the tenter method; trimming equipment 130 for cutting both side parts in the direction of the width of the film 11 and to separate it into two sheets of films 11A and 11B; equipment 140 for making air intervene between films 11A and 11B; 2nd heating equipment 150 for keeping both side parts of both of films 11A and 11B by the tenter method and for thermally treating; and winder 160 for films 11A and 11B processed by heat treatment Biaxial orientation equipment 11 is provided with the following: a pair of 1st pinch rollers 111 which was placed above the other equipment; heating equipment 113 provided with heater 112 for heating raw film 11; V-shape guide board 114 for folding film 11 flat; and a pair of 2nd pinch roller 115 placed at the bottom of guide board 114. Heater 112 of heating equipment 113 consists of four heaters 112A–112D which are arranged close together along the surface of the periphery of bubble 16 as shown in FIG. 16. Among heaters 112A–112D, a pair of heaters, 112A and 112B, which are opposite each other, are arranged to heat parts 16A and 16B which will be side parts 11X, 11Y in the direction of the width (see FIG. 17) of film 11, when bubble 16 is folded flat. Also, another pair of opposite heaters 112C, 112D are arranged to heat parts 16C, 16D which are equivalent to the product of bubble 16. It is also possible to choose an infrared ray heater and so on as heaters 112A–112D. First heating equipment 120 is provided with tenter 121 to keep both side parts, the direction of the width 11X, 11Y of film 11, folded flat, and hot blast stove 122 for heating film 11. Trimming equipment 130 has a blade 131 for separating flat film 11 into two films 11A and 11B. More than one guide rollers 105 are provided between this trimming equipment 130 and first heating equipment 120. Air intervention equipment 140 is composed of a pair of rollers 141A and 141B which were separately arranged up and down. Second heating equipment 150 is equipped with tenter 151 to keep both side parts of films 11A and 11B in it, and hot blast stove 152 to heat films 11A and 11B. More than one guide-filler 142 (see FIG. 18) which is provided with spiral ditches 141 is provided between the second heating equipment 150 and air intervention equipment 140. These guide rollers 142 with ditches, were processed by galvanizing with chrome after ditch processing With this manufacture equipment, biaxial orientation and heat treatment were implemented in the following way. First, a compound having a mixture of nylon 6 (Ny6) and meta-xylylene adipamide (MXD6) at the weight ratio of 60:40 was fusion kneaded at 270 degrees C in an extruder, the dissolved material was extruded from a die with diameter of 90 mm in the form of circular cylinder, then, it was quickly and continuously cooled with water and a raw film was made. Next, tubular film 11, which was heated with heating equipment 113 by biaxial orientation equipment 110 of tubular method as shown in FIGS. 14 and 15, was expanded into bubble 16 at a fixed internal pressure Then it was biaxial oriented to orient it in the direction of TD and in the direction of MD with a difference of winding speed of upper and lower pinch rollers 111 and 115. Biaxially oriented bubble 16 was folded flat by guide board 114 and second pinch roller 115 and flat film 11 was made. Incidentally, the method for pouring air into film 11 for the tubular method is optional (For example, refer to the No. TOKUKAISHO 64-71727 bulletin) When the heating equipment 113 was heated, the temperature of heaters 112A and 112B, arranged on side parts 16A and 16B, which became side parts 11X and 11Y, in the direction of the width of bubble 16 was set to 280 degrees C. On the other hand, the temperature of heaters 112C and 112D which were arranged on the side of 16C and 16D which were equivalent to the product of bubble 16 was set to 320 degrees C. In this case, all the heater average temperatures were 300 degrees C. By heating and orienting under these conditions, as shown in FIGS. 19, 20, straight line X1 which was drawn in the direction of TD of film 11, before orienting, shifts to the direction of MD, centered between parts 16C and 16D which is equivalent to the product of bubble 16 on the orienting and bowing phenomenon shown by curve X2. Next, in the first heat treatment step, with 1st heating equipment 120, while both side parts 11X and 11Y in the direction of the width of film 11 with tenter 121 were held, heat treatment was implemented at 150 degrees C with hot blast stove 122. Bowing conditions in the opposite direction, which deny the bowing conditions at the time of biaxial orientation, occurs in this heat treatment. In this heat treatment, the relaxation ratio of film 11 was set at 5% (the direction of TD) By implementing heat treatment in the condition that film 11 is rather relaxed, shrinkage percentage is reduced by increasing the crystallinity of film 11, and film 11 with good dimensional stability is obtained by this. Next, with trimming equipment 130, side parts 11X and 11Y in the direction of the width of this film 11 were cut with blade 131 and separated into two films 11A and 11B. Incidentally, cutting of this film 11 can be implemented so as to cause a partial fragment of a side part, in the direction of the width, by placing blade 131 rather inside from a fold part, or it may be implemented so as not to cause fragment of a side part in the direction of the width by placing blade 131 to the fold part of film 11. With trimming at this step, it is possible to make trimming loss small in the following manufacturing process. Next, with air intervention equipment 140, films 11A and 11B are separately fed into the top and the bottom of rollers 141A and 141B so that air touches the inside of films 11A and 11B. Then, they are fed, in order, into roller 142 with ditch which are shown in FIG. 18 and both films 11A and 11B were put together while air is kept between both films 11A and 11B. When this roller 142 with ditch is used, a condition of good contact between films 11A and 11B and the air is obtained through these ditches 141 so that it is possible to prevent fusion between films 11A and 11B effectively. Next, in the second heat treatment step with 2nd heating equipment 150, two films 11A and 11B in overlapped conditions were thermally treated at 210 degrees C, while both side parts 11X and 11Y in the direction of the width were held by tenter 151. Even in this heat treatment, bowing conditions in the opposite direction which further denies the bowing conditions at the time of the biaxial orientation occurred. As a result, each of bowing conditions in both directions cancel each other, and the bowing ratio of films 11A and 11B becomes small. In the second heat treatment step, the relaxation ratio of films 11A and 11B was set at 5% (the direction of TD). Lastly, films 11A and 11B were wound with winding machine 160. In this experimental example, a stability of the forming of bubble 16 at the time of biaxial orientation was evaluated. The bowing ratio of film 11 after orienting and that of films 11A and 11B after the second step heat treatment was measured. And then, ease in cutting straight was measured and evaluated at the center part and side part in the direction of the width of films 11A and 11B after the second heat treatment step. Those results are shown in Tables 26, 27. The bowing ratio is the value which is obtained by drawing marked line S1 with fixed width in the perpendicular direction in the direction of the movement of film 11 see FIG. 21(A), measuring delay of marked line S2 Δb after the second heat treatment step and width 1 see FIG. 21(B), and calculating by (Δb/1)×100%, Δb being shown in FIG. 21(B). Incidentally, in this experimental example, bowing in quantity of −Δb1 occurs first because of the bowing conditions in a biaxial orientation manufacturing process. Then, bowing in an opposite direction in total quantity of +Δb2 occurs in the first and second heat treatment step manufacturing processes After all, Δb after the second heat treatment step is equivalent to |Δb2−Δb1|. The ease in cutting straight was evaluated as follows: That is, as shown in FIG. 22, break 172 is provided to film 171 with a width of 20 cm at an interval Ws of 2 cm, film 171 is torn up along these breaks 172, width We of side part 174 is measured in addition to film fragment 173, deviation α with original interval Ws is obtained as the following:

$$\alpha = [(Ws - We)/Ws] \times 100$$

This measurement was done to 10 sheets of film fragments 173. Evaluations in the column of ease in cutting straight in Table 27 is a double circle for one whose average α (%) is less than ±10% (ease in cutting straight is very good), a circle for one with ±10%≦α≦±30% (ease in cutting straight is good), and a cross for one whose α (%) is more than ±30% (ease to cut straight is poor). When α (%) is ±30% or more, it becomes difficult to cut film 18 straight. In the column of evaluation of ease in cutting straight, a double circle means that both of ease in cutting straight at the center part and the side part are better than a circle, a triangle shows that one of ease in cutting straight at the center part or the side part is represented by a cross, and a cross shows both of ease in cutting straight at the center part and the side part are represented by a cross. Incidentally, in the column for stability of forming a bubble, a circle shows that bubble bend diameter change is ±1% or less and that break and instability of the bubble (vertical movement, shaking and so on) do not occur, a cross shows that break and instability of a bubble (vertical movement, shaking and so on) occur so that continuous forming with stability is difficult Also, in the-column of total evaluation, a double circle shows that the stability of the forming of a bubble is a circle and the bowing ratio after the second heat treatment step is less than 5%, and a cross shows that the stability of forming of the bubble is a cross or that the bowing ratio after the second heat treatment step is 5% or more.

Experimental Examples 75–80

The raw film with the composition which is shown in Table 26 was made with an extruder, as in experimental example 74, then, the splittable films in each experimental example were made by biaxially orienting the film At the time of this orienting, the temperature of heaters 112A and 112B which were arranged on sides 16A and 16B which became side parts 11X and 11Y in the direction of the width of bubble 16 of heating equipment 113 and the temperature of heaters 112C and 112D which was arranged to part 16C and 16D which is equivalent to the product of bubble 16 were set as shown in Table 26. Next, the first and second heat treatment steps were applied to these splittable films 11 at the temperature and the relaxation ratio shown in Table 26. While other conditions were the same as above experimental examples, splittable films 11A and 11B, which were obtained under the condition of each experimental example were obtained. These splittable films, which are obtained under conditions of experimental examples 75–80, were evaluated from stability of the forming of bubble 16 at time of biaxial orientation as experimental example 74. Also, the bowing ratio of film 11 after orienting and that of the splittable film after the second heat treatment step were measured Also, ease in cutting straight was measured and evaluated at the center part and the side part of films 11A and 11B. Those results are shown in Tables 26, 27.

Control Examples 53–58

The raw film with the composition which is shown in Table 26 was made with an extruder, as in experimental example 74, and the films in each control examples were made by biaxially orienting this film. At the time of this orienting, the temperature of heaters 112A and 112B, which were arranged on sides 16A and 16B, which become side parts 11X and 11Y, in the direction of the width of bubble 16, of heating equipment 113, and the temperature of heaters 112C and 112D, which was arranged to part 16C and 16D, which is equivalent to the product of bubble 16, were set as shown in Table 26. Next, the first and second step heat treatments were given to these films at the temperature and the relaxation ratio which are shown in Table 26. While other conditions were the same as the above experimental examples, films which are obtained under the condition of control examples 53–58 were obtained. These films which were obtained under conditions of these control examples were evaluated for stability of the forming of the bubble at the time of biaxial orientation as in experimental example 74. Also, the bowing ratio of film after orienting and that of the film after the second heat treatment step were measured. Also, ease in cutting straight was measured and evaluated at the center part and the side part of the films. Those results are shown in Tables 26 and 27.

Consideration of experimental examples 74–80 and control examples 53–58.

According to Tables 26, 27, in experimental examples 74–80, when raw film 11 was heated by biaxial orientation, the heating temperature at parts of 16A and 16B, which became side parts 11X and 11Y in the direction of width, when folding the bubble 16, was set lower than the temperature of heating of parts 16C and 16D, which are equivalent to the product of film 11. And then, the temperature of a pair of heaters 112A and 112B, which were arranged on the side of parts 16A and 16B, which became side parts 11X and 11Y in the direction of the width of bubble 16, was set 10–100 degrees C lower than the average temperature (300 degrees C) of all heaters. The temperature of another pair of heaters 112C and 112D, which were arranged on the side of parts 16C and 16D, which are equivalent to the product of bubble 16, was set 10–100 degrees C higher than the average temperature of all the heaters. Therefore, it was shown that bubble 16, at the time of biaxial orientation, was stable and that the final bowing ratio, after the second heat treatment step became low. Therefore, according to this experimental example, it is possible to limit a bowing ratio so that it is small so that good ease in cutting straight is obtained at either of the center part and the side part to the width of the splittable film. On the other hand, the control examples 53 and 54, to the contrary to the invention of experimental examples 74–80, heating temperature of parts 16A and 16B, which become side parts 11X and 11Y, in the direction of the width when folding bubble 16, was set higher than the heating temperature of parts 16C and 16D, which are equivalent to the film product. Therefore, it was shown that the final bowing ratio after the second heat treatment step became high and that ease in cutting straight was especially poor at the film side part. In control example 55, the temperature of a pair of heaters 112A and 112B, which were arranged on the side of parts 16A and 16B, which becomes side parts 11X and 11Y in the direction of the width of bubble 16, was set more than 100 degrees C higher than the average temperature (300 degree C) of all the heaters. On the other hand, the temperature of another pair of heaters 112C and 112D, which were arranged on the side of parts 16C and 16D, which are equivalent to the product of bubble 16, was set more than 100 degrees C higher than the average temperature of all the heaters. Therefore, the stability of bubble 16 was poor. In control examples 56 and 57, a film does not have the composition of the splittable film which is obtained under the conditions of this invention. Therefore, an ease in cutting straight was poor for both the film center part and the side part. In control example 58, the film did not have the composition of the splittable film which was obtained under the conditions of this invention. Moreover, when the film is heated by the biaxial orientation, the heating temperature of parts 16A and 16B, which become side parts 11X and 11Y, in direction of width, when folding bubble 16, is the same as the heating temperature of parts 16C and 16D, which are equivalent to the film product. Therefore, it was shown that the final bowing ratio became high and that the ease in cutting straight was poor at both the film center part and the side part. Incidentally, in experimental examples 74–80, heating equipment 113 may be composed, for example, by placing a total of 10 heaters, two each to the parts 16A and 16B, which becomes side parts 11X and 11Y in the direction of the width of bubble 16, three each to the parts 16C and 16D, which are equivalent to the product of bubble 16. With this, the temperature control of the heating conditions of bubble 16 improves more and it is possible to smooth the temperature inclination over a film circumference. Also, in experimental examples 74–80, for example, by adjusting the coil density of the infrared ray heater, it is possible to control the heating temperature at parts 16A and 16B, which become side parts 11X and 11Y, in the direction of width of bubble 16, and at parts 16C and 16D, which are equivalent to the product of bubble 16. Moreover, in experimental examples 74–80, hot blast stoves 122 and 152 were provided in the first and second heating equipment 120 and 150, but, for example, an infrared ray heater and so on may be placed instead.

Experimental Example 81

Figure 23:
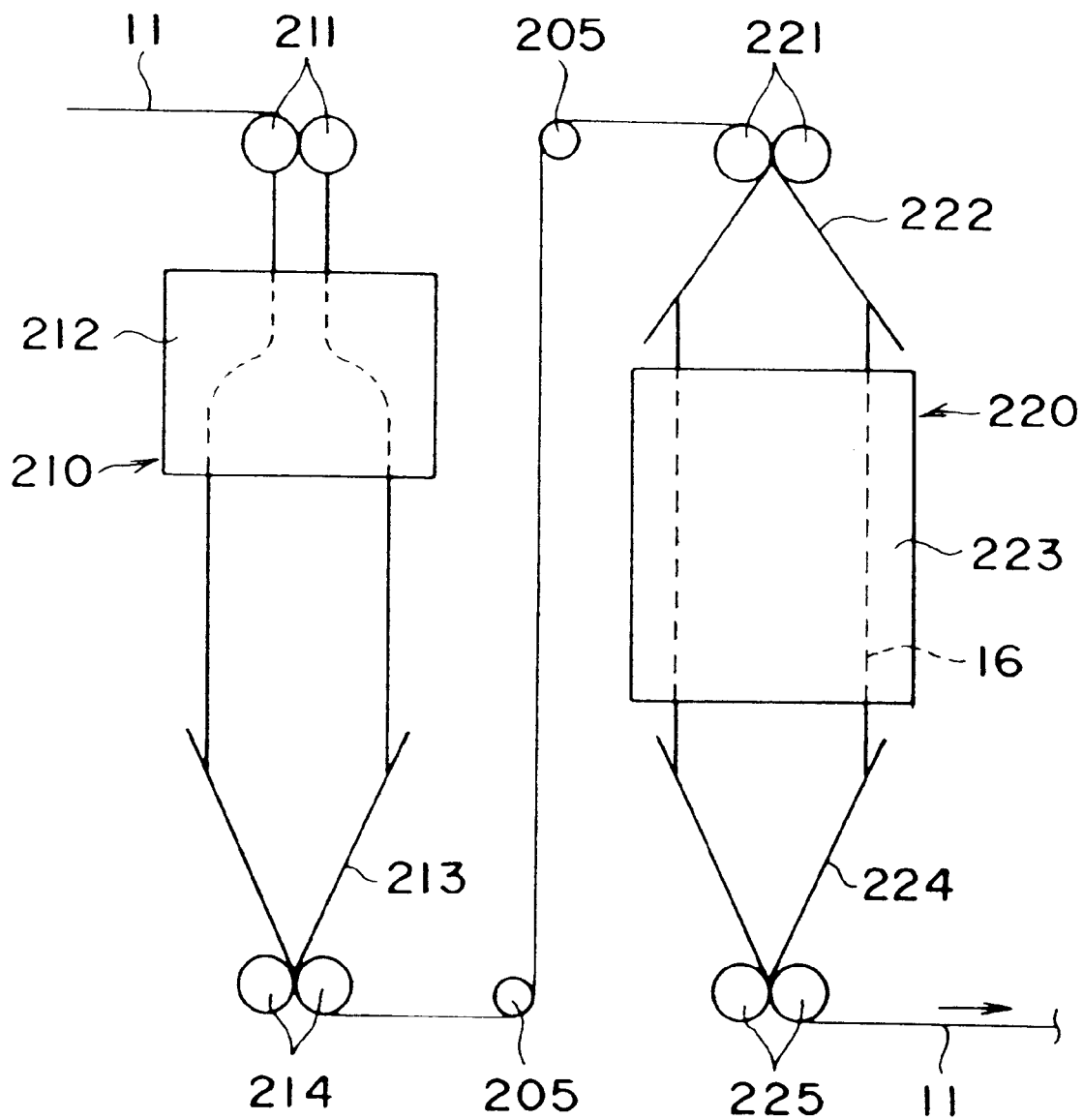
FIG. 23 is a schematic diagram of equipment used in another production method for the oriented splittable film according to the present invention.
Figure 24A:
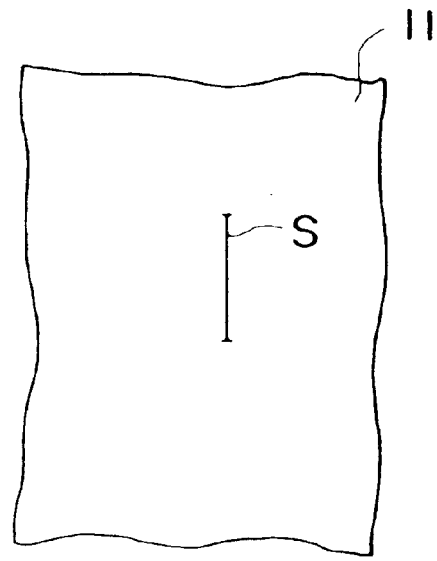
FIG. 24(A) and FIG. 24(B) are front views which show a measuring method of the bowing ratio in another production method.
Figure 24B:
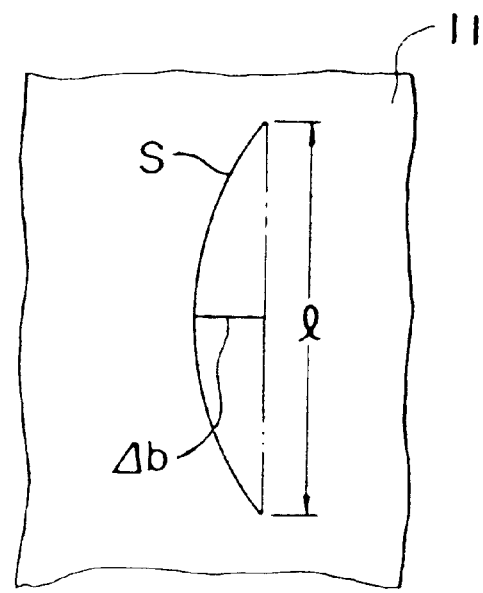

The manufacturing equipment used in experimental examples 81–86 are explained with the drawing. As shown in FIG. 23, this manufacturing equipment is equipped with the following: equipment 210 to biaxially orient raw film 11 in the tubular method; first heating equipment 220 to thermally process raw film 11 in the tubular method; trimming equipment 130, the same as in experimental examples 74–80, as shown in FIG. 16; air intervention equipment 140; second heating equipment 150 to thermally process by the tenter method; and winding machine 160. Biaxial orientation equipment 210 is provided with the following: a pair of first pinch rollers 211 which were arranged above the other equipment; heating furnace 212 to heat film 11; V-shape guide board 213 to fold film 11 flat; and a pair of second pinch rollers 214 which were arranged at the bottom of guide board 213 It is possible to choose an infrared ray heater and so on as heating equipment of heating furnace 212 optionally. First heating equipment 220 is equipped with the following: a pair of first pinch rollers 221 which were arranged as above; opposite V-shape guide board 222 which was installed from first pinch roller 221; hot blast stove 223 to heat film 11; V-shape guide board 224 to fold film 11 flat; and a pair of second pinch rollers 225 which were arranged at the bottom of guide board 224. Guide roller 205 is provided between the first heating equipment 220 and biaxial orientation means 210. With this manufacture equipment, the biaxial orientation and the heat treatment were carried out in the following way: First, a mixture of nylon 6 (Ny6) and meta-xylylene adipamide (MXD6), at the weight ratio of 60:40, was fusion kneaded in an extruder at 270 degrees C, then, dissolved material was extruded from a die with a diameter of 90 mm as a film in the form of a circular cylinder, and it was quickly cooled with water and a raw film was made. Next, as shown in FIG. 23, with biaxial orientation equipment 11, in the tubular method, tubular film 11 which was heated with heating equipment 212 was biaxially oriented to the direction of TD by expanding it into bubble 15 at a fixed internal pressure and to the direction of MD with the difference in winding speed of upper and lower pinch rollers 211 and 214. Bubble 16, which was biaxially oriented, was folded with guide board 213 and second pinch roller 214 and made into flat film 11. Next, with first heating equipment 220 in the tubular method, heat treatment at 120 degrees C was given to film 11 with hot blast stove 223. In this heat treatment, the relaxation ratio of film 11 was set at 0% (the directions of HD and TD). The first heat treatment step increases the crystallinity of film 11. Therefore, sliding efficiency between overlapped films becomes good and it is possible to prevent fusion. In addition, the first step heat treatment is carried out in the tubular method, therefore, the bowing ratio of the first heat treatment step can be set at 0 and the final bowing ratio of film can be reduced. Next, as shown in FIG. 15, these two films 11A and 11B were thermally treated at 210 degrees C with the second heating equipment 150 in the tenter method, through trimming equipment 130 and air intervention equipment 140, while both side parts of overlapped films 11A and 11B were held by tenter 151. In the second heat treatment step, the relaxation ratio of films 11A and 11B was set to 10%. Lastly, splittable films 11A and 11B were wound by winding machine 160. In this experimental example, stability of the bubble 16 at time of the first heat treatment step and the fusion condition of films 11A and 11B at the time of the second heat treatment step were evaluated. Also, the bowing ratio of film 11 after the first heat treatment step and after the second heat treatment step were measured. And then, the ease in cutting straight of films 11A and 11B, after the second heat treatment step, was measured at the center part and the side part in the direction of the width and then evaluated. Those results are shown in Tables 28 and 29. As shown in FIGS. 24(A) and 24(B), the bowing ratio is a value computed by drawing a marked line S with a fixed width in a direction perpendicular to the direction of the movement in film 11 see FIG. 24(A), measuring the delay Δb of marked line S after the second step heat treatment and width 1 see FIG. 24(B), and calculated by (Δb/1)×100%. The ease in cutting straight was evaluated like in experimental example 74.

Experimental Examples 82–86

The raw film with a composition which is shown in Table 28 was made with an extruder like in example 51, then film 11 in each experimental example was made by biaxially orienting this film. Then, to these films 11, the first heat treatment step in the tubular method and the second heat treatment step in the tenter method were carried out with the temperature and the relaxation ratio which are shown in Table 28. While other conditions were the same as experimental example, the splittable film which was obtained under the conditions of experimental examples 82–86 was obtained. The splittable film which was obtained under conditions of these experimental examples 82–86 was evaluated for stability of the bubble 16 at the time of the first heat treatment step and fusion of films 11A and 11B at the time of the second heat treatment step like in experimental example 81. Also, the bowing ratio of film 11 after the first heat treatment step and after the second step heat treatment were measured. And then, the straight line cut characteristic of films 11A and 11B after the second heat treatment step was measured at the center part and the side part and evaluated. Those results are shown in Tables 28 and 29.

Control Examples 59–63

The raw film with a composition which is shown in Table 28 was made with an extruder like in example 81 above, then, the film in each control example was made by biaxially orienting this film. Then, to these films, the first heat treatment step in the tubular method and the second heat treatment step in the tenter method were carried out with a temperature and a relaxation ratio which are shown in Table 28. While other conditions were the same as experimental example 81, the splittable film which was obtained under the conditions of control examples 59–63 was obtained. The splittable film which was obtained under the conditions of these control examples 59–63 was evaluated for stability of the bubble at time of the first heat treatment step and fusion of films at the time of the second heat treatment step like in experimental example 81. Also, the bowing ratio of the film after the first heat treatment step and after the second heat treatment step were measured. And then, the straight line cut characteristic of the film after the second heat treatment step was measured at the center part and the side part and evaluated. Those results are shown in Tables 28, 29.

Consideration of experimental examples 81–86 and control examples 59–63.

According to Tables 28 and 29, in experimental examples 81–86, since the first heat treatment step in the tubular method was given to film 11 at a temperature of 120–190 degrees C and the second heat treatment step was given in the tenter method at a temperature of 190–220 degrees C after that, it was shown that the stability of bubble 16 at the time of the first heat treatment step was good and the final bowing ratio after the second heat treatment step became low. Therefore, according to experimental examples 81–86, it is possible to keep the bowing ratio small, so that good ease in cutting straight is obtained at both of the center part and the side part in the direction of the width of film 11. On the other hand, according to control example 59, the temperature of the first heat treatment step is above the temperature range which is obtained under the conditions of this invention, therefore, it was shown that the stability of the bubble became poor. According to control examples 60 and 61, without implementing the first heat treatment step in the tubular method, only the second heat treatment step in the tenter method was given, fusion of films occurred during the second heat treatment step. besides, the bowing ratio was high and the ease in cutting straight was poor at the side part. According to control examples 62 and 63, the composition of the film to be used had a different composition then the splittable film which was obtained under the conditions of this invention. Therefore, an ease in cutting straight was poor in either of the center part or the side part.

Experimental Example 87

The film manufacturing equipment that was used in experimental examples 87–93 is equipped with the following: extruder; biaxially orienting equipment in the tubular method (see FIG. 12); first heating equipment in the tenter method (see FIG. 14); trimming equipment; air intervention equipment; second heating equipment in the tenter method (see FIG. 15); and winding machine. Next, the production method of the splittable film which can be obtained under the conditions of this experimental example which uses this production equipment is explained. A mixture of Ny6 and MXD6 at a weight ratio of 60:40 is fusion kneaded at 270 degrees C in an extruder, dissolved material was extruded from a die with diameter of 90 mm as a film in the form of circular cylinder and quickly cooled, and a raw film was made. Next, this raw film was inserted among a pair of pinch rollers and heated by the heater while impressing gas inside. At the same time, air was blasted from an air ring to expand into air at the beginning of the orienting, and the bubble is folded flat through a guide board, and wound by a pair of pinch rollers at the lower-stream in order to biaxially orient in the tubular method in the direction of MD and the direction of TD simultaneously The magnification during this orienting was 3.0 to both directions of MD and TD. Next, this flat film was sent to the first heating equipment, then, the first heat treatment step was given to the film for 5 seconds at 120 degrees C with-both side parts kept by the tenter (see FIG. 14). The relaxation ratio of the film at this time was 5%. Next, both side parts of a flat film were cut into two films with the trimming equipment and these films were separated with a roller so that the inner surface contacted atmosphere. Those two films were put together again by being passed continuously through rollers with a groove. Next, these films were sent to the second heating equipment, then, the second heat treatment step was given to the film for 10 seconds at 210 degrees C with both side parts kept by the tenter (see FIG. 15). The relaxation ratio of the film at this time was 5%. Next, these splittable films which were thermally treated were wound with a winding machine. Then, in this experimental example, the fusion condition of the films at the time of the first and second heat treatment steps were evaluated. measurement and evaluation results for the bowing ratio of the films after the first and second heat treatment steps and ease in cutting straight of the obtained film at the center part and side part in the direction of width are shown in the following Table 31. In the column of fusion, a circle shows no occurrence of fusion, a triangle shows that fusion occurred but it was delaminated with some power, and a cross shows that fusion occurred. The bowing ratio was measured like in experimental example 81. The ease in cutting straight was evaluated like in experimental example 74.

Experimental Examples 88–93

In the above experimental example 87, the mixing rate between Ny6 and MXD6 and temperature and relaxation ratio of the first and second heat treatment steps were set as in Table 30. A splittable film which was obtained under the conditions of experimental examples 88–93 was obtained from a manufacturing process like in experimental example 87. The splittable film which was obtained under the conditions of each experimental example was also measured and evaluated from fusion conditions, bowing ratio and ease in cutting straight, like in the experimental example 87. Those results are shown in Table 31.

Control Examples 64–70

In the above experimental example 87, mixing rate between Ny6 and MXD6 and temperature and relaxation ratio of the first and second heat treatment steps are set as in Table 30. A film which was obtained under the conditions of control example 64–70 was obtained from a manufacturing process like in experimental example 87. The film which was obtained under the conditions of each control example was also measured and evaluated from fusion conditions, bowing ratio and ease in cutting straight, like in the experimental example 87. Those results are shown in Table 31.

Consideration of experimental examples 87–93 and control examples 64–70.

The splittable film which was obtained under the conditions of this invention not only has an excellent ease in splitting and ease in cutting straight, but also has enough strength. Besides, if the production method of the splittable film which is obtained under the conditions of this invention is used, these characteristics of a splittable film can be favorably obtained.

TABLE 1

| | Raw material composition | | Orientation ratio | | Split strength (kg/cm) | | Ease to split | Ease to cut straight | Impact strength (kg · cm/cm) | | Total evaluation |
|---|---|---|---|---|---|---|---|---|---|---|---|
| | Ny66 | MXD6 | MD | TD | MD | TD | | | | | |
| Ex. 1 | 80 | 20 | 3.0 | 3.0 | 7.0 | 7.0 | ○ | ○ | 7000 | ○ | ○ |
| Ex. 2 | 70 | 30 | 3.0 | 3.0 | 6.5 | 6.5 | ○ | ○ | 6000 | ○ | ○ |
| Ex. 3 | 60 | 40 | 3.0 | 3.0 | 6.0 | 6.0 | ○ | ⊙ | 5000 | ○ | ⊙ |
| Ex. 4 | 60 | 40 | 3.5 | 3.0 | 5.0 | 5.5 | ○ | ⊙ | 6000 | ○ | ⊙ |
| Ex. 5 | 60 | 40 | 4.0 | 3.0 | 3.8 | 4.5 | ○ | ⊙ | 6500 | ○ | ⊙ |
| Ex. 6 | 60 | 40 | 3.5 | 3.5 | 4.5 | 4.5 | ○ | ⊙ | 6500 | ○ | ⊙ |
| Ex. 7 | 50 | 50 | 3.5 | 3.0 | 5.0 | 5.5 | ○ | ⊙ | 5500 | ○ | ⊙ |
| Ex. 8 | 40 | 60 | 3.5 | 3.0 | 5.5 | 5.5 | ○ | ⊙ | 5000 | ○ | ⊙ |
| Ex. 9 | 60 | 40 | 2.8 | 2.8 | 7.0 | 7.0 | ○ | ○ | 5000 | ○ | ○ |
| Ex. 10 | 60 | 40 | 3.5 | 3.0 | 5.0 | 5.5 | ○ | ⊙ | 6000 | ○ | ⊙ |
| Ex. 11 | 60 | 40 | 3.5 | 3.0 | 5.0 | 5.5 | ○ | ⊙ | 6000 | ○ | ⊙ |

According to Tables 30 and 31, the production method of the splittable film which was obtained under the conditions of experimental examples 87–93 shows that no fusion of the splittable occurred in the first heat treatment step and in the second heat treatment step Also, bowing of a splittable film after the first step and second step of heat treatments is limited to a minimum, and it was shown that the ease in cutting straight is good in both of the center part and the side part of the film. On the other hand, control example 64 shows that the fusion of the film occurred at the time of the first heat treatment step since its treatment temperature was beyond the temperature range of this invention. Comparative example 65 shows that the ease in cutting straight was poor at the side part of the film since the relaxation ratio at the time of the second heat treatment step was beyond the range of this invention. Comparative example 66 shows that fusion occurred during the second heat treatment step and the film could not be commercialized, since the second heat treatment step was not properly implemented under the condition in which air was intervened between separated films. Comparative example 67 shows that bowing of the film after the second heat treatment step became big since the temperature during the second heat treatment step was beyond the range of this invention. Therefore, the ease in cutting straight was poor at the side part of the film and it could not be commercialized. Comparative example 68 shows that bowing of the film after heat treatment became big since the first heat treatment step was not implemented and the heat treatment step wasn't properly implemented under the condition in which air was intervened between separated films. Similarly, the ease in cutting straight was poor at the side part of the film. Comparative example 69 shows that because the temperature of first heat treatment step was lower than the temperature range of this invention, fusion of the film occurred during the second heat treatment step, bowing of the film after the heat treatment was big. Similarly, the ease in cutting straight was poor at side part of the film. Comparative example 70 shows that the ease in cutting straight was poor at both of the film center part and the side part since the film composition was only nylon 60

TABLE 2

| | Sealable film, thickness (μm) | Ease to split | Ease to cut straight | Strength against falling | Total evaluation |
|---|---|---|---|---|---|
| Ex. 1 | LL, 50 | ○ | ○ | ○ | ○ |
| Ex. 2 | LL, 50 | ○ | ○ | ○ | ○ |
| Ex. 3 | LL, 50 | ○ | ⊙ | ○ | ⊙ |
| Ex. 4 | LL, 50 | ○ | ⊙ | ○ | ⊙ |
| Ex. 5 | LL, 50 | ○ | ⊙ | ○ | ⊙ |
| Ex. 6 | LL, 50 | ○ | ⊙ | ○ | ⊙ |
| Ex. 7 | LL, 50 | ○ | ⊙ | ○ | ⊙ |
| Ex. 8 | LL, 50 | ○ | ⊙ | ○ | ⊙ |
| Ex. 9 | LL, 50 | ○ | ○ | ○ | ○ |
| Ex. 10 | CPP, 60 | ○ | ⊙ | ○ | ⊙ |
| Ex. 11 | PE, 20/ LL, 60 | ○ | ⊙ | ○ | ⊙ |

TABLE 3

| | Raw material composition | | Orientation ratio | | Split strength (kg/cm) | | Ease to | Ease to cut | Impact strength | | Total evaluation |
|---|---|---|---|---|---|---|---|---|---|---|---|
| | Ny66 | MXD6 | MD | TD | MD | TD | split | straight | (kg · cm/cm) | | |
| Cont. 1 | 100 | 0 | 3.0 | 3.0 | 8.5 | 8.5 | Δ | × | 7500 | ○ | × |
| Cont. 2 | 100 | 0 | 3.2 | 3.2 | 8.0 | 8.0 | Δ | × | 8000 | ○ | × |
| Cont. 3 | 90 | 10 | 3.0 | 3.0 | 7.5 | 7.5 | Δ | × | 7000 | ○ | × |
| Cont. 4 | 20 | 80 | 3.0 | 3.0 | 7.0 | 7.0 | ○ | ○ | 3000 | × | × |
| Cont. 5 | 0 | 100 | 3.0 | 3.0 | 6.0 | 6.0 | ○ | ○ | 3000 | × | × |
| Cont. 6 | 60 | 40 | 2.0 | 2.0 | 9.5 | 9.5 | × | × | 3000 | × | × |
| Cont. 7 | 60 | 40 | 2.5 | 2.5 | 9.0 | 9.0 | × | × | 3500 | × | × |
| Cont. 8 | 60 | 40 | 2.7 | 2.7 | 8.0 | 8.0 | Δ | × | 4000 | × | × |

TABLE 4

| | Sealable film, thickness (μm) | Ease to split | Ease to cut straight | Strength against falling | Total evaluation |
|---|---|---|---|---|---|
| Cont. 1 | LL, 50 | Δ | × | ○ | × |
| Cont. 2 | LL, 50 | Δ | × | ○ | × |
| Cont. 3 | LL, 50 | Δ | × | ○ | × |
| Cont. 4 | LL, 50 | ○ | ○ | × | × |
| Cont. 5 | LL, 50 | ○ | ○ | × | × |
| Cont. 6 | LL, 50 | × | × | × | × |
| Cont. 7 | LL, 50 | × | × | × | × |
| Cont. 8 | LL, 50 | Δ | × | × | × |

TABLE 5

| | Raw material composition | | Orientation ratio | | Split strength (kg/cm) | |
|---|---|---|---|---|---|---|
| | Ny6-66 | MXD6 | MD | TD | MD | TD |
| Ex. 12 | 80 | 20 | 3.0 | 3.0 | 7.5 | 7.5 |
| Ex. 13 | 70 | 30 | 3.0 | 3.0 | 7.0 | 7.0 |
| Ex. 14 | 60 | 40 | 3.0 | 3.0 | 6.5 | 6.5 |
| Ex. 15 | 60 | 40 | 3.5 | 3.0 | 5.5 | 6.0 |
| Ex. 16 | 60 | 40 | 4.0 | 3.0 | 4.3 | 5.0 |
| Ex. 17 | 60 | 40 | 3.5 | 3.5 | 5.5 | 5.5 |
| Ex. 18 | 50 | 50 | 3.5 | 3.0 | 5.5 | 6.0 |
| Ex. 19 | 40 | 60 | 3.5 | 3.0 | 6.0 | 6.0 |
| Ex. 20 | 60 | 40 | 2.8 | 2.8 | 7.5 | 7.5 |
| Ex. 21 | 60 | 40 | 3.5 | 3.0 | 5.5 | 6.0 |
| Ex. 22 | 60 | 40 | 3.5 | 3.0 | 5.5 | 6.0 |

TABLE 6

| | Ease to split | Ease to cut straight | Impact strength (kg · cm/cm) | | Total evaluation |
|---|---|---|---|---|---|
| Ex. 12 | Δ | ○ | 8500 | ○ | ○ |
| Ex. 13 | ○ | ○ | 7500 | ○ | ○ |
| Ex. 14 | ○ | ◎ | 6500 | ○ | ◎ |
| Ex. 15 | ○ | ◎ | 7500 | ○ | ◎ |
| Ex. 16 | ○ | ◎ | 8000 | ○ | ◎ |
| Ex. 17 | ○ | ◎ | 8000 | ○ | ◎ |
| Ex. 18 | ○ | ◎ | 7000 | ○ | ◎ |
| Ex. 19 | ○ | ◎ | 6500 | ○ | ◎ |
| Ex. 20 | Δ | ○ | 6000 | ○ | ○ |
| Ex. 21 | ○ | ◎ | 7500 | ○ | ◎ |
| Ex. 22 | ○ | ◎ | 7500 | ○ | ◎ |

TABLE 7

| | Sealable film, thickness (μm) | Ease to split | Ease to cut straight | Strength against falling | Total evaluation |
|---|---|---|---|---|---|
| Ex. 12 | LL, 50 | Δ | ○ | ○ | ○ |
| Ex. 13 | LL, 50 | ○ | ○ | ○ | ○ |
| Ex. 14 | LL, 50 | ○ | ◎ | ○ | ◎ |
| Ex. 15 | LL, 50 | ○ | ◎ | ○ | ◎ |
| Ex. 16 | LL, 50 | ○ | ◎ | ○ | ◎ |
| Ex. 17 | LL, 50 | ○ | ◎ | ○ | ◎ |
| Ex. 18 | LL, 50 | ○ | ◎ | ○ | ◎ |
| Ex. 19 | LL, 50 | ○ | ◎ | ○ | ◎ |
| Ex. 20 | LL, 50 | Δ | ○ | ○ | ○ |
| Ex. 21 | EVA, 50 | ○ | ◎ | ○ | ◎ |
| Ex. 22 | PE, 20/ LL, 60 | ○ | ◎ | ○ | ◎ |

TABLE 8

| | Raw material composition | | Orientation ratio | | Split strength (kg/cm) | |
|---|---|---|---|---|---|---|
| | Ny6-66 | MXD6 | MD | TD | MD | TD |
| Cont. 9 | 100 | 0 | 3.0 | 3.0 | 9.0 | 9.0 |
| Cont. 10 | 100 | 0 | 3.2 | 3.2 | 8.5 | 8.5 |
| Cont. 11 | 90 | 10 | 3.0 | 3.0 | 8.0 | 8.0 |
| Cont. 12 | 20 | 80 | 3.0 | 3.0 | 7.5 | 7.5 |
| Cont. 13 | 0 | 100 | 3.0 | 3.0 | 6.5 | 6.5 |
| Cont. 14 | 60 | 40 | 2.0 | 2.0 | 10.0 | 10.0 |
| Cont. 15 | 60 | 40 | 2.5 | 2.5 | 9.5 | 9.5 |
| Cont. 16 | 60 | 40 | 2.7 | 2.7 | 8.5 | 8.5 |

TABLE 9

| | Ease to split | Ease to cut straight | Impact strength (kg · cm/cm) | | Total evaluation |
|---|---|---|---|---|---|
| Cont. 9 | × | × | 7500 | ○ | × |
| Cont. 10 | Δ | × | 9000 | ○ | × |
| Cont. 11 | Δ | × | 8500 | ○ | × |
| Cont. 12 | Δ | ○ | 4000 | × | × |
| Cont. 13 | ○ | ○ | 3000 | × | × |
| Cont. 14 | × | × | 4500 | ○ | × |
| Cont. 15 | × | × | 5000 | ○ | × |
| Cont. 16 | Δ | × | 5500 | ○ | × |

TABLE 10

| | Sealable film, thickness (μm) | Ease to split | Ease to cut straight | Strength against falling | Total evaluation |
|---|---|---|---|---|---|
| Cont. 9 | LL, 50 | × | × | ○ | × |
| Cont. 10 | LL, 50 | △ | × | ○ | × |
| Cont. 11 | LL, 50 | △ | × | ○ | × |
| Cont. 12 | LL, 50 | △ | ○ | × | × |
| Cont. 13 | LL, 50 | ○ | ○ | × | × |
| Cont. 14 | LL, 50 | × | × | × | × |
| Cont. 15 | LL, 50 | × | × | ○ | × |
| Cont. 16 | LL, 50 | △ | × | ○ | × |

TABLE 11

| | Raw material composition ① | | ② | | ③ | Thickness ratio ①②③ | Orientation ratio | |
|---|---|---|---|---|---|---|---|---|
| | Ny6 | MXD6 | EVOH | Ny6 | MXD6 | | MD | TD |
| Ex. 23 | 80 | 20 | 32% | 80 | 20 | 2:1:2 | 3.0 | 3.0 |
| Ex. 24 | 70 | 30 | 32% | 70 | 30 | 2:1:2 | 3.0 | 3.0 |
| Ex. 25 | 60 | 40 | 32% | 60 | 40 | 2:1:2 | 3.0 | 3.0 |
| Ex. 26 | 60 | 40 | 32% | 60 | 40 | 2:1:2 | 3.5 | 3.0 |
| Ex. 27 | 60 | 40 | 32% | 60 | 40 | 2:1:2 | 4.0 | 3.0 |
| Ex. 28 | 60 | 40 | 32% | 60 | 40 | 2:1:2 | 3.5 | 3.5 |
| Ex. 29 | 50 | 50 | 32% | 50 | 50 | 2:1:2 | 3.5 | 3.0 |
| Ex. 30 | 40 | 60 | 32% | 40 | 60 | 2:1:2 | 3.5 | 3.0 |
| Ex. 31 | 60 | 40 | 32% | 60 | 40 | 2:1:2 | 2.8 | 2.8 |
| Ex. 32 | 60 | 40 | 32% | 60 | 40 | 1:1:1 | 3.5 | 3.0 |
| Ex. 33 | 60 | 40 | 32% | 60 | 40 | 1:2:1 | 3.5 | 3.0 |
| Ex. 34 | 60 | 40 | 29% | 60 | 40 | 2:1:2 | 3.5 | 3.0 |
| Ex. 35 | 60 | 40 | 38% | 60 | 40 | 2:1:2 | 3.5 | 3.0 |
| Ex. 36 | 60 | 40 | 45% | 60 | 40 | 2:1:2 | 3.5 | 3.0 |
| Ex. 37 | 60 | 40 | 32% | | — | 1:1— | 3.5 | 3.0 |
| Ex. 38 | 60 | 40 | 32% | | — | 1:2— | 3.5 | 3.0 |
| Ex. 39 | 60 | 40 | 32% | 60 | 40 | 2:1:2 | 3.5 | 3.0 |
| Ex. 40 | 60 | 40 | 32% | 60 | 40 | 2:1:2 | 3.5 | 3.0 |

TABLE 12

| | Split strength (kg/cm) | | Ease to split | Ease to cut straight | Impact strength (kg·cm/cm) | Total evaluation |
|---|---|---|---|---|---|---|
| | MD | TD | | | | |
| Ex. 23 | 7.0 | 7.0 | ○ | ○ | 8000 ○ | ○ |
| Ex. 24 | 6.5 | 6.5 | ○ | ○ | 7000 ○ | ○ |
| Ex. 25 | 6.0 | 6.0 | ○ | ◎ | 6000 ○ | ◎ |
| Ex. 26 | 6.8 | 6.8 | ○ | ◎ | 7000 ○ | ◎ |
| Ex. 27 | 6.5 | 6.5 | ○ | ◎ | 7500 ○ | ◎ |
| Ex. 28 | 6.5 | 6.5 | ○ | ◎ | 7500 ○ | ◎ |
| Ex. 29 | 7.0 | 7.0 | ○ | ◎ | 6500 ○ | ◎ |
| Ex. 30 | 7.0 | 7.0 | ○ | ◎ | 6000 ○ | ◎ |
| Ex. 31 | 8.8 | 8.8 | △ | ○ | 5500 ○ | ○ |
| Ex. 32 | 8.0 | 8.0 | △ | ○ | 5500 ○ | ○ |
| Ex. 33 | 8.7 | 8.9 | △ | ○ | 5000 ○ | ○ |
| Ex. 34 | 7.0 | 7.0 | ○ | ○ | 6500 ○ | ◎ |
| Ex. 35 | 6.5 | 6.5 | ○ | ○ | 7500 ○ | ◎ |
| Ex. 36 | 6.5 | 6.5 | ○ | ○ | 8000 ○ | ◎ |
| Ex. 37 | 8.0 | 8.0 | △ | ○ | 5500 ○ | ○ |
| Ex. 38 | 8.5 | 8.6 | △ | ○ | 5000 ○ | ○ |
| Ex. 39 | 6.8 | 6.8 | ○ | ◎ | 7000 ○ | ◎ |
| Ex. 40 | 6.8 | 6.8 | ○ | ◎ | 7000 ○ | ◎ |

TABLE 13

| | Sealable film, thickness (μm) | Ease to split | Ease to cut straight | Strength against falling | Total evaluation |
|---|---|---|---|---|---|
| Ex. 23 | LL, 50 | ○ | ○ | ○ | ○ |
| Ex. 24 | LL, 50 | ○ | ○ | ○ | ○ |
| Ex. 25 | LL, 50 | ○ | ◎ | ○ | ◎ |
| Ex. 26 | LL, 50 | ○ | ◎ | ○ | ◎ |
| Ex. 27 | LL, 50 | ○ | ◎ | ○ | ◎ |
| Ex. 28 | LL, 50 | ○ | ◎ | ○ | ◎ |
| Ex. 29 | LL, 50 | ○ | ◎ | ○ | ◎ |
| Ex. 30 | LL, 50 | ○ | ◎ | ○ | ◎ |
| Ex. 31 | LL, 50 | △ | ○ | ○ | ○ |
| Ex. 32 | LL, 50 | △ | ○ | ○ | ○ |
| Ex. 33 | LL, 50 | △ | ○ | ○ | ○ |
| Ex. 34 | LL, 50 | ○ | ○ | ○ | ◎ |
| Ex. 35 | LL, 50 | ○ | ○ | ○ | ◎ |
| Ex. 36 | LL, 50 | ○ | ○ | ○ | ◎ |
| Ex. 37 | LL, 50 | △ | ○ | ○ | ○ |
| Ex. 38 | LL, 50 | △ | ○ | ○ | ○ |
| Ex. 39 | EVA, 50 | ○ | ◎ | ○ | ◎ |
| Ex. 40 | PE, 20/ LL, 60 | ○ | ◎ | ○ | ◎ |

TABLE 14

| | Raw material composition ① | | ② | | ③ | Thickness ratio ①②③ | Orientation ratio | |
|---|---|---|---|---|---|---|---|---|
| | Ny6 | MXD6 | EVOH | Ny6 | MXD6 | | MD | TD |
| Cont. 17 | 100 | 0 | 32% | 100 | 0 | 2:1:2 | 3.0 | 3.0 |
| Cont. 18 | 100 | 0 | 32% | 100 | 0 | 1:1:1 | 3.0 | 3.0 |
| Cont. 19 | 100 | 0 | 38% | 100 | 0 | 2:1:2 | 3.0 | 3.0 |
| Cont. 20 | 100 | 0 | 32% | 100 | 0 | 2:1:2 | 3.5 | 3.5 |
| Cont. 21 | 90 | 10 | 32% | 90 | 10 | 2:1:2 | 3.5 | 3.0 |
| Cont. 22 | 20 | 80 | 32% | 20 | 80 | 2:1:2 | 3.5 | 3.0 |
| Cont. 23 | | 0 | 32% | | 0 | 0:1:0 | 3.5 | 3.0 |
| Cont. 24 | 100 | — | | — | — | 1:0:0 | 3.5 | 3.0 |
| Cont. 25 | — | 100 | — | — | — | 1:0:0 | 3.5 | 3.0 |
| Cont. 26 | 60 | 40 | 32% | 60 | 40 | 2:1:2 | 2.0 | 2.0 |
| Cont. 27 | 60 | 40 | 32% | 60 | 40 | 2:1:2 | 2.5 | 2.5 |
| Cont. 28 | 60 | 40 | 32% | 60 | 40 | 2:1:2 | 2.7 | 2.7 |
| Cont. 29 | 60 | 40 | 32% | 60 | 40 | 1:4:1 | 3.0 | 3.0 |
| Cont. 30 | 60 | 40 | 32% | 60 | 40 | 1:3:1 | 3.5 | 3.0 |

TABLE 15

| | Split strength (kg/cm) | | Ease to split | Ease to cut straight | Impact strength (kg·cm/cm) | Total evaluation |
|---|---|---|---|---|---|---|
| | MD | TD | | | | |
| Cont. 17 | 25.0 | 26.0 | × | × | 7500 ○ | × |
| Cont. 18 | 35.0 | 37.0 | × | × | 6000 ○ | × |

TABLE 15-continued

| | Split strength (kg/cm) | | Ease to | Ease to cut | Impact strength | Total evalu- |
|---|---|---|---|---|---|---|
| | MD | TD | split | straight | (kg · cm/cm) | ation |
| Cont. 19 | 22.0 | 20.0 | × | × | 7800 ○ | × |
| Cont. 20 | 18.0 | 18.0 | × | × | 8300 ○ | × |
| Cont. 21 | 15.0 | 15.0 | × | × | 7000 ○ | × |
| Cont. 22 | 15.0 | 15.0 | × | × | 3500 × | × |
| Cont. 23 | 11.0 | 11.0 | Δ | × | 6000 ○ | × |
| Cont. 24 | 8.5 | 8.7 | Δ | × | 8000 ○ | × |
| Cont. 25 | 6.5 | 6.5 | ○ | ○ | 3000 × | × |

TABLE 16

| | Sealable film, thickness (μm) | Ease to split | Ease to cut straight | Strength against falling | Total evalu-ation |
|---|---|---|---|---|---|
| Cont. 17 | LL, 50 | × | × | ○ | × |
| Cont. 18 | LL, 50 | × | × | ○ | x |
| Cont. 19 | LL, 50 | × | × | ○ | × |
| Cont. 20 | LL, 50 | × | × | ○ | × |
| Cont. 21 | LL, 50 | × | × | ○ | × |
| Cont. 22 | LL, 50 | × | × | × | × |
| Cont. 23 | LL, 50 | Δ | × | ○ | × |
| Cont. 24 | LL, 50 | Δ | × | ○ | × |
| Cont. 25 | LL, 50 | ○ | ○ | × | × |
| Cont. 26 | LL, 50 | × | × | × | × |
| Cont. 27 | LL, 50 | × | × | × | × |
| Cont. 28 | LL, 50 | Δ | × | ○ | × |
| Cont. 29 | LL, 50 | × | × | × | × |
| Cont. 30 | LL, 50 | × | × | ○ | × |

TABLE 17

| | Raw material composition | | | | | | Thickness ratio | Orientation ratio | |
|---|---|---|---|---|---|---|---|---|---|
| | ① | | ② | | ③ | | | | |
| | Ny6 | MXD6 | Ny6 | MXD6 | Ny6 | MXD6 | ①②③ | MD | TD |
| Ex. 41 | 95 | 5 | 60 | 40 | 95 | 5 | 1:2:1 | 3.0 | 3.0 |
| Ex. 42 | 90 | 10 | 70 | 30 | 90 | 10 | 1:2:1 | 3.0 | 3.0 |
| Ex. 43 | 80 | 20 | 40 | 60 | 80 | 20 | 1:2:1 | 3.0 | 3.0 |
| Ex. 44 | 80 | 20 | 40 | 60 | 80 | 20 | 1:2:1 | 3.5 | 3.0 |
| Ex. 45 | 80 | 20 | 40 | 60 | 80 | 20 | 1:2:1 | 4.0 | 3.0 |
| Ex. 46 | 80 | 20 | 60 | 40 | 80 | 20 | 1:2:1 | 3.5 | 3.5 |
| Ex. 47 | 80 | 20 | 60 | 40 | 80 | 20 | 1:2:1 | 3.5 | 3.0 |
| Ex. 48 | 80 | 20 | 60 | 40 | 80 | 20 | 2:1:2 | 3.5 | 3.0 |
| Ex. 49 | 80 | 20 | 60 | 40 | 80 | 20 | 1:1:1 | 3.5 | 3.0 |
| Ex. 50 | 80 | 20 | 60 | 40 | 80 | 20 | 1:4:1 | 3.5 | 3.0 |
| Ex. 51 | 80 | 20 | 60 | 40 | 80 | 20 | 1:8:1 | 3.5 | 3.0 |
| Ex. 52 | 80 | 20 | 60 | 40 | 80 | 20 | 1:2:1 | 3.0 | 3.0 |
| Ex. 53 | 80 | 20 | 60 | 40 | 80 | 20 | 1:2:1 | 2.8 | 2.8 |
| Ex. 54 | 80 | 20 | 60 | 40 | 70 | 30 | 1:2:1 | 3.0 | 3.0 |
| Ex. 55 | 80 | 20 | 60 | 40 | — | | 2:1 | 3.0 | 3.0 |
| Ex. 56 | 80 | 20 | 60 | 40 | 80 | 20 | 1:2:1 | 3.5 | 3.0 |
| Ex. 57 | 80 | 20 | 60 | 40 | 80 | 20 | 1:2:1 | 3.5 | 3.0 |
| Ex. 58 | 80 | 20 | 60 | 40 | 80 | 20 | 1:2:1 | 3.5 | 3.0 |
| Ex. 59 | 80 | 20 | 60 | 40 | 80 | 20 | 1:2:1 | 3.5 | 3.0 |

TABLE 15-continued

| | Split strength (kg/cm) | | Ease to | Ease to cut | Impact strength | Total evalu- |
|---|---|---|---|---|---|---|
| | MD | TD | split | straight | (kg · cm/cm) | ation |
| Cont. 25 | | | | | | |
| Cont. 26 | 15.0 | 15.0 | × | × | 4000 × | × |
| Cont. 27 | 12.0 | 12.0 | × | × | 4500 ○ | × |
| Cont. 28 | 9.0 | 9.0 | × | × | 5000 ○ | × |
| Cont. 29 | 18.0 | 18.0 | × | × | 4500 ○ | × |
| Cont. 30 | 11.0 | 12.0 | × | × | 5000 ○ | × |

TABLE 18

| | Split strength (kg/cm) | | Ease to | Ease to cut | Impact strength | Total evalu- |
|---|---|---|---|---|---|---|
| | MD | TD | split | straight | (kg · cm/cm) | ation |
| Ex. 41 | 7.0 | 7.0 | ○ | ⊙ | 8000 ○ | ⊙ |
| Ex. 42 | 6.5 | 6.5 | ○ | ⊙ | 7500 ○ | ⊙ |
| Ex. 43 | 6.0 | 6.0 | ○ | ⊙ | 7000 ○ | ⊙ |
| Ex. 44 | 5.0 | 5.3 | ○ | ⊙ | 7500 ○ | ⊙ |
| Ex. 45 | 4.5 | 4.9 | ○ | ⊙ | 8000 ○ | ⊙ |
| Ex. 46 | 5.5 | 5.5 | ○ | ⊙ | 8000 ○ | ⊙ |
| Ex. 47 | 6.0 | 6.2 | ○ | ⊙ | 7500 ○ | ⊙ |
| Ex. 48 | 6.5 | 6.5 | ○ | ⊙ | 8500 ○ | ⊙ |
| Ex. 49 | 6.0 | 5.9 | ○ | ⊙ | 7800 ○ | ⊙ |
| Ex. 50 | 5.5 | 5.5 | ○ | ⊙ | 7500 ○ | ⊙ |
| Ex. 51 | 5.0 | 5.0 | ○ | ⊙ | 7000 ○ | ⊙ |
| Ex. 52 | 6.5 | 6.5 | ○ | ⊙ | 7100 ○ | ⊙ |
| Ex. 53 | 7.0 | 7.0 | ○ | ⊙ | 6500 ○ | ⊙ |
| Ex. 54 | 6.3 | 6.0 | ○ | ⊙ | 7000 ○ | ⊙ |

TABLE 18-continued

| | Split strength (kg/cm) | | Ease to split | Ease to cut straight | Impact strength (kg · cm/cm) | Total evaluation |
|---|---|---|---|---|---|---|
| | MD | TD | | | | |
| Ex. 55 | 6.0 | 6.0 | ○ | ◎ | 7500 | ◎ |
| Ex. 56 | 6.0 | 6.2 | ○ | ◎ | 7500 | ◎ |
| Ex. 57 | 6.0 | 6.2 | ○ | ◎ | 7500 | ◎ |
| Ex. 58 | 6.0 | 6.2 | ○ | ◎ | 7500 | ◎ |
| Ex. 59 | 6.0 | 6.2 | ○ | ◎ | 7500 | ◎ |

TABLE 19

| | Sealable film, thickness (μm) | Ease to split | Ease to cut straight | Strength against falling | Total evaluation |
|---|---|---|---|---|---|
| Ex. 41 | LL, 50 | ○ | ◎ | ○ | ◎ |
| Ex. 42 | LL, 50 | ○ | ◎ | ○ | ◎ |
| Ex. 43 | LL, 50 | ○ | ◎ | ○ | ◎ |
| Ex. 44 | LL, 50 | ○ | ◎ | ○ | ◎ |
| Ex. 45 | LL, 50 | ○ | ◎ | ○ | ◎ |
| Ex. 46 | LL, 50 | ○ | ◎ | ○ | ◎ |
| Ex. 47 | LL, 50 | ○ | ◎ | ○ | ◎ |
| Ex. 48 | LL, 50 | ○ | ◎ | ○ | ◎ |
| Ex. 49 | LL, 50 | ○ | ◎ | ○ | ◎ |
| Ex. 50 | LL, 50 | ○ | ◎ | ○ | ◎ |
| Ex. 51 | LL, 50 | ○ | ◎ | ○ | ◎ |
| Ex. 52 | LL, 50 | ○ | ◎ | ○ | ◎ |
| Ex. 53 | LL, 50 | ○ | ◎ | ○ | ◎ |
| Ex. 54 | LL, 50 | ○ | ◎ | ○ | ◎ |
| Ex. 55 | LL, 50 | ○ | ◎ | ○ | ◎ |
| Ex. 56 | EVA, 50 | ○ | ◎ | ○ | ◎ |
| Ex. 57 | CPP, 50 | ○ | ◎ | ○ | ◎ |
| Ex. 58 | PE, 20 LL, 60 | ○ | ◎ | ○ | ◎ |
| Ex. 59 | LL, 80 | ○ | ◎ | ○ | ◎ |

TABLE 20

| | Raw material composition | | | | | | Thickness ratio | Orientation ratio | |
|---|---|---|---|---|---|---|---|---|---|
| | ① | | ② | | ③ | | | | |
| | Ny6 | MXD6 | Ny6 | NXD6 | NY6 | MXD6 | ①②③ | MD | TD |
| Cont. 31 | 100 | 0 | — | | — | | 1:0:0 | 3.0 | 3.0 |
| Cont. 32 | 100 | 0 | — | | — | | 1:0:0 | 3.2 | 3.2 |
| Cont. 33 | 90 | 10 | — | | — | | 1:0:0 | 3.0 | 3.0 |
| Cont. 34 | 0 | 100 | — | | — | | 1:0:0 | 3.0 | 3.0 |
| Cont. 35 | 100 | 0 | 60 | 40 | 100 | 0 | 1:2:1 | 3.0 | 3.0 |
| Cont. 36 | 100 | 0 | 60 | 40 | 100 | 0 | 1:2:1 | 3.2 | 3.2 |
| Cont. 37 | 100 | 0 | 60 | 40 | 100 | 0 | 2:1:2 | 3.5 | 3.0 |
| Cont. 38 | 100 | 0 | 60 | 40 | 100 | 0 | 3:1:3 | 3.5 | 3.0 |
| Cont. 39 | 80 | 20 | 60 | 40 | 80 | 20 | 1:2:1 | 2.0 | 2.0 |
| Cont. 40 | 80 | 20 | 60 | 40 | 80 | 20 | 1:2:1 | 2.5 | 2.5 |
| Cont. 41 | 80 | 20 | 60 | 40 | 80 | 20 | 1:2:1 | 2.7 | 2.7 |

TABLE 21

| | Split strength (kg/cm) | | Ease to split | Ease to cut straight | Impact strength (kg · cm/cm) | Total evaluation |
|---|---|---|---|---|---|---|
| | MD | TD | | | | |
| Cont. 31 | 8.5 | 8.5 | Δ | X | 8000 | ○ | X |
| Cont. 32 | 8.0 | 8.0 | Δ | X | 9000 | ○ | X |

TABLE 21-continued

| | Split strength (kg/cm) | | Ease to split | Ease to cut straight | Impact strength (kg · cm/cm) | Total evaluation |
|---|---|---|---|---|---|---|
| | MD | TD | | | | |
| Cont. 33 | 7.5 | 7.5 | Δ | X | 8000 | ○ | X |
| Cont. 34 | 6.5 | 6.5 | ○ | ○ | 3000 | X | X |
| Cont. 35 | 7.0 | 6.9 | ○ | X | 7400 | ○ | X |
| Cont. 36 | 6.6 | 6.5 | ○ | X | 8000 | ○ | X |
| Cont. 37 | 8.0 | 8.0 | Δ | X | 8500 | ○ | X |
| Cont. 38 | 9.0 | 9.2 | X | X | 8500 | ○ | X |
| Cont. 39 | 9.5 | 9.5 | X | X | 4500 | ○ | X |
| Cont. 40 | 9.0 | 9.0 | X | X | 5000 | ○ | X |
| Cont. 41 | 8.0 | 8.2 | Δ | X | 6000 | ○ | X |

TABLE 22

| | Sealable film, thickness (μm) | Ease to split | Ease to cut straight | Strength against falling | Total evaluation |
|---|---|---|---|---|---|
| Cont. 31 | LL, 50 | Δ | X | ○ | X |
| Cont. 32 | LL, 50 | Δ | X | ○ | X |
| Cont. 33 | LL, 50 | Δ | X | ○ | X |
| Cont. 34 | LL, 50 | ○ | ○ | X | X |
| Cont. 35 | LL, 50 | ○ | X | ○ | X |
| Cont. 36 | LL, 50 | ○ | X | ○ | X |
| Cont. 37 | LL, 50 | Δ | X | ○ | X |
| Cont. 38 | LL, 50 | X | X | ○ | X |
| Cont. 39 | LL, 50 | X | X | X | X |
| Cont. 40 | LL, 50 | Δ | X | ○ | X |
| Cont. 41 | LL, 50 | Δ | X | ○ | X |

TABLE 23

| | Layer structure and thickness (μm) | Ease cut straight | Split resistance |
|---|---|---|---|
| Ex. 60 | N-M(15)/N-M(15)/L-LDPE(50) | ◎ | ◎ |
| Ex. 61 | ONy(15)/N-M(15)/L-LDPE(50) | ◎ | ◎ |
| Ex. 62 | ONy(15)/N-M(15)/L-LDPE(50) | ◎ | ◎ |
| Ex. 63 | ONy(15)/N-M(15)/CPP(60) | ◎ | ◎ |

TABLE 23-continued

|  | Layer structure and thickness (μm) | Ease cut straight | Split resistance |
|---|---|---|---|
| Ex. 64 | PET(12)/Al. foil (9)/N-M(15)/CPP(70) | ◎ | ◎ |
| Ex. 65 | PET(12)/AL. foil (7)/N-M(15)/CPP(60) | ◎ | ◎ |
| Ex. 66 | OPP(20)/N-M(15)/L-LDPE(80) | ◎ | ◎ |
| Ex. 67 | OPP(20)/N-M(15)/L-LDPE(50) | ◎ | ◎ |
| Cont. 42 | N-M(15)/ONy(15)/L-LDPE)(50) | ○ | ○ |
| Cont. 43 | N-M(15)/ONy(15)/CPP(60) | ○ | ○ |
| Cont. 44 | PET(12)/N-M(15)/AL. foil (7)/CPP(60) | ○ | ○ |
| Cont. 45 | N-M(15)/OPP(20)/L-LDPE(50) | ○ | ○ |
| Cont. 46 | Ony(15)/Ony(15)/L-LDPE(50) | X | ○ |
| Cont. 47 | ONy(15)/ONy(15)/CPP(60) | X | X |
| Cont. 48 | PET(12)/ONy(15)/AL. foil (7)/CPP(60) | X | X |

TABLE 25

|  | Impact strength (kg · cm/cm) | Ease to cut straight | Total evaluation |
|---|---|---|---|
| Ex. 68 | 7,000 | ○ | ◎ | ○ |
| Ex. 69 | 6,500 | ○ | ◎ | ○ |
| Ex. 70 | 6,300 | ○ | ◎ | ○ |
| Ex. 71 | 5,800 | ○ | ◎ | ○ |
| Ex. 72 | 7,500 | ○ | ◎ | ○ |
| Ex. 73 | 5,100 | ○ | ◎ | ○ |
| Cont. 49 | 6,500 | ○ | ○ | X |
| Cont. 50 | 6,800 | ○ | ○ | X |
| Cont. 51 | 3,500 | X | X | X |
| Cont. 52 | 8,000 | ○ | X | X |

TABLE 26

|  | Raw material composition | | Heating (° C.) | | Stability of bubble | 1st step treatment | | 2nd step treatment | |
|---|---|---|---|---|---|---|---|---|---|
|  | Ny6 | MXD6 | Sides parts width direction | Products | | temperature (° C.) | Relaxation ratio (%) | temperature (° C.) | Relaxation ratio (%) |
| Ex. 74 | 60 | 40 | 280 | 320 | ○ | 150 | 5 | 210 | 5 |
| Ex. 75 | 60 | 40 | 260 | 340 | ○ | 150 | 5 | 210 | 5 |
| Ex. 76 | 60 | 40 | 240 | 360 | ○ | 150 | 5 | 210 | 5 |
| Ex. 77 | 60 | 40 | 220 | 380 | ○ | 150 | 5 | 210 | 5 |
| Ex. 78 | 60 | 40 | 200 | 400 | ○ | 150 | 5 | 210 | 5 |
| Ex. 79 | 60 | 40 | 240 | 360 | ○ | 100 | 5 | 210 | 5 |
| Ex. 80 | 60 | 40 | 240 | 360 | ○ | 120 | 5 | 210 | 5 |
| Cont. 53 | 60 | 40 | 320 | 280 | ○ | 150 | 5 | 210 | 5 |
| Cont. 54 | 60 | 40 | 340 | 260 | ○ | 150 | 5 | 210 | 5 |
| Cont. 55 | 60 | 40 | 180 | 420 | x | 150 | 5 | 210 | 5 |
| Cont. 56 | 100 | — | 260 | 340 | ○ | 150 | 5 | 210 | 5 |
| Cont. 57 | 100 | — | 240 | 360 | ○ | 150 | 5 | 210 | 5 |
| Cont. 58 | 100 | — | 300 | 300 | ○ | 150 | 5 | 210 | 5 |

TABLE 24

|  | Raw material composition | | Fusion kneading before extruding | Resin temperature (° C.) | Orientating moldidability | wall thickness (%) | |
|---|---|---|---|---|---|---|---|
|  | Ny6 | MXD6 | forming | | | | |
| Ex. 68 | 60 | 40 | Presence | 275 | ○ | ±5.1 | ○ |
| Ex. 69 | 60 | 40 | Presence | 280 | ○ | ±4.6 | ○ |
| Ex. 70 | 60 | 40 | Presence | 286 | ○ | ±4.9 | ○ |
| Ex. 71 | 60 | 40 | Presence | 293 | ○ | ±5.2 | ○ |
| Ex. 72 | 80 | 20 | Presence | 276 | ○ | ±4.3 | ○ |
| Ex. 73 | 40 | 60 | Presence | 282 | ○ | ±5.3 | ○ |
| Cont. 49 | 60 | 40 | Non-presence | Dry blend | ○ | ±11.3 | X |
| Cont. 50 | 70 | 30 | Non-presence |  | ○ | ±9.1 | X |
| Cont. 51 | 60 | 40 | Presence | 304 | X | ±5.2 | ○ |
| Cont. 52 | 100 | — | Non-presence |  | ○ | ±4.2 | ○ |

TABLE 27

|  | Bowing ratio (%) | | Ease to cut straight (mm) | | cut evaluation | Total evaluation |
|---|---|---|---|---|---|---|
|  | After oriented | Heating treatment | cetral portion | side portion | | |
| Ex. 74 | −0.6 | 4.8 | 1 ◎ | 6 ○ | ◎ | ◎ |
| Ex. 75 | −1.1 | 4.3 | 1 ◎ | 5 ○ | ◎ | ◎ |
| Ex. 76 | −1.5 | 4.0 | 0 ◎ | 4 ○ | ◎ | ◎ |
| Ex. 77 | −2.1 | 3.4 | 0 ◎ | 3 ○ | ◎ | ◎ |
| Ex. 78 | −2.4 | 3.0 | 0 ◎ | 2 ◎ | ◎ | ◎ |
| Ex. 79 | −1.5 | 4.4 | 1 ◎ | 3 ○ | ◎ | ◎ |
| Ex. 80 | −1.5 | 4.2 | 0 ◎ | 3 ○ | ◎ | ◎ |
| Cont. 53 | +0.5 | 6.0 | 2 ◎ | 11 X | Δ | X |
| Cont. 54 | +1.1 | 6.6 | 2 ◎ | 14 X | Δ | X |
| Cont. 55 | −2.6 | 2.9 | 0 ◎ | 2 ◎ | ◎ | X |
| Cont. 56 | −1.0 | 4.5 | 26 X | 38 X | X | X |
| Cont. 57 | −1.4 | 4.1 | 22 X | 33 X | X | X |
| Cont. 58 | 0 | 5.5 | 29 X | 41 X | X | X |

TABLE 28

| | Raw material composition | | 1st step treatment | | Stability of bubble | 2st step treatment | | Fusion |
|---|---|---|---|---|---|---|---|---|
| | Ny6 | MXD6 | temperature (°C.) | Relaxation ratio (%) | | temperature (°C.) | Relaxation ratio (%) | |
| Ex. 81 | 60 | 40 | 120 | 0 | ○ | 210 | 10 | ○ |
| Ex. 82 | 60 | 40 | 150 | 0 | ○ | 210 | 10 | ○ |
| Ex. 83 | 60 | 40 | 180 | 0 | ○ | 210 | 10 | ○ |
| Ex. 84 | 60 | 40 | 180 | 5 | ○ | 210 | 5 | ○ |
| Ex. 85 | 80 | 20 | 180 | 0 | ○ | 210 | 10 | ○ |
| Ex. 86 | 40 | 60 | 180 | 0 | ○ | 210 | 10 | ○ |
| Cont. 59 | 60 | 40 | 200 | 0 | X | 210 | 10 | ○ |
| Cont. 60 | 60 | 40 | — | — | — | 210 | 10 | X |
| Cont. 61 | 60 | 40 | — | — | — | 210 | 5 | X |
| Cont. 62 | 100 | — | 180 | 0 | ○ | 210 | 10 | ○ |
| Cont. 63 | 100 | — | 150 | 0 | ○ | 210 | 10 | ○ |

TABLE 29

| | Bowing ratio (%) | | Ease to cut straight (mm) | | cut evaluation | Total evaluation |
|---|---|---|---|---|---|---|
| | 1st step | 1st step | cetral portion | side portion | | |
| Ex. 81 | 0 | 4.9 | 1 ◉ | 5 ○ | ◉ | ◉ |
| Ex. 82 | 0 | 4.5 | 0 ◉ | 4 ○ | ◉ | ◉ |
| Ex. 83 | 0 | 3.9 | 0 ◉ | 3 ○ | ◉ | ◉ |
| Ex. 84 | 0 | 3.4 | 0 ◉ | 2 ◉ | ◉ | ◉ |
| Ex. 85 | 0 | 4.0 | 1 ◉ | 4 ○ | ◉ | ◉ |
| Ex. 86 | 0 | 3.9 | 1 ◉ | 3 ○ | ◉ | ◉ |
| Cont. 59 | 0 | 6.0 | 0 ◉ | 2 ◉ | ◉ | X |
| Cont. 60 | — | 9.7 | 2 ◉ | 15 X | Δ | X |
| Cont. 61 | — | 8.2 | 2 ◉ | 12 X | Δ | X |
| Cont. 62 | 0 | 4.2 | 24 X | 35 X | X | X |
| Cont. 63 | 0 | 3.8 | 20 X | 31 X | X | X |

TABLE 30

| | Raw terial composition | | 1st step reatment | | air intervention separation | 2st step reatment | |
|---|---|---|---|---|---|---|---|
| | Ny6 | MXD6 | temperature (°C.) | Relaxation ratio (%) | | temperature (°C.) | Relaxation ratio (%) |
| Ex. 87 | 60 | 40 | 120 | 5 | Presence | 210 | 5 |
| Ex. 88 | 60 | 40 | 150 | 5 | Presence | 210 | 5 |
| Ex. 89 | 60 | 40 | 180 | 5 | Presence | 210 | 5 |
| Ex. 90 | 60 | 40 | 150 | 0 | Presence | 210 | 5 |
| Ex. 91 | 60 | 40 | 150 | 5 | Presence | 210 | 10 |
| Ex. 92 | 60 | 40 | 150 | 5 | Presence | 210 | 15 |
| Ex. 93 | 80 | 20 | 150 | 5 | Presence | 210 | 5 |
| Cont. 64 | 60 | 40 | 200 | 5 | — | 210 | 5 |
| Cont. 65 | 60 | 40 | 150 | 5 | Presence | 210 | 20 |
| Cont. 66 | 60 | 40 | 150 | 5 | Non-presence | 210 | 5 |
| Cont. 67 | 60 | 40 | 150 | 5 | Presence | 225 | 5 |

TABLE 30-continued

|  | Raw material composition | | 1st step treatment | | | 2st step treatment | |
|---|---|---|---|---|---|---|---|
|  | Ny6 | MXD6 | tempera ture (° C.) | Relaxation ratio (%) | air intervention separation | tempera ture (° C.) | Relaxation ratio (%) |
| Cont. 68 | 60 | 40 | — | — | Non-presence | 210 | 5 |
| Cont. 68 | 60 | 40 | 80 | 5 | Presence | 210 | 5 |
| Cont. 70 | 100 | — | 150 | 5 | Presence | 210 | 5 |

TABLE 31

|  | Fusion | | Bowing ratio (%) | | Ease to cut straight (mm) | | cut evalu-ation | Total evalu-ation |
|---|---|---|---|---|---|---|---|---|
|  | 1st step treatment | 2st step treatment | After 1st step treatment | After 2st step treatment | cetral portion | side portion | | |
| Ex. 87 | ○ | ○ | 12 | 5.1 | 1 ◉ | 4 ○ | ◉ | ◉ |
| Ex. 88 | ○ | ○ | 16 | 4.5 | 0 ◉ | 4 ○ | ◉ | ◉ |
| Ex. 89 | ○ | ○ | 13 | 4.1 | 0 ◉ | 3 ○ | ◉ | ◉ |
| Ex. 90 | ○ | ○ | 13 | 4.3 | 0 ◉ | 2 ◉ | ◉ | ◉ |
| Ex. 91 | ○ | ○ | 16 | 4.9 | 1 ◉ | 5 ○ | ◉ | ◉ |
| Ex. 92 | ○ | ○ | 16 | 5.1 | 1 ◉ | 6 ○ | ◉ | ◉ |
| Ex. 93 | ○ | ○ | 17 | 4.6 | 1 ◉ | 5 ○ | ◉ | ◉ |
| Cont. 64 | × | — | 35 | — | — | — | — | × |
| Cont. 65 | ○ | ○ | 16 | 8.5 | 2 ◉ | 10 × | Δ | × |
| Cont. 66 | ○ | × | 16 | 4.5 | 1 ◉ | 4 ○ | ◉ | × |
| Cont. 67 | ○ | × | 16 | 9.8 | 3 ○ | 18 × | Δ | × |
| Cont. 68 | — | × | — | 9.6 | 2 ◉ | 15 × | Δ | × |
| Cont. 68 | ○ | × | 08 | 5.9 | 2 ◉ | 9 × | Δ | × |
| Cont. 70 | ○ | ○ | 17 | 5.5 | 29 × | 41 × | × | × |

What is claimed is:

1. A method of producing an easily splittable oriented film comprising the steps of:

dissolving a raw material mixture containing nylon and meta-xylylene adipamide at a weight ratio of 40–85:60–15;

extruding the dissolved raw material mixture in an extruder to obtain a raw film;

biaxially orienting the raw film in a machine direction and a transverse direction at an orientation ratio of at least 2.8 by a tubular method by heating a side portion of the film at a lower temperature than another portion of the film while folding the film;

folding the biaxially oriented film flat; and thermally treating the biaxially oriented film.

2. The method of claim 1, additionally comprising a step of kneading the dissolved raw material mixture at a temperature up to 300° C. prior to the extrusion step.

3. The method of claim 1, wherein the heating step is performed by a plurality of heaters provided around the film and the temperature of the heater that heats the side portion of the film is 10–100° C. lower than the average temperature of all the heaters.

4. The method of claim 1, wherein the heating temperature at an edge of the side portion of the film is at a minimum and the heating temperature at the center of the other portion of the folded film is at a maximum.

5. The method of claim 1, wherein the heating is performed in two stages, a first stage of heating by a tubular method at a temperature of 120–190° C. and a second stage of heating by a tenter method at a temperature of 190–220° C.

6. The method of claim 1, wherein the thermal treatment is performed in two stages, a first stage comprising the steps of holding the side portions according to a tenter method, heating the film at a temperature between 120–190° C. and at a relaxation ratio of no more than 15%, and cutting the side portions to form two films, and a second stage comprising holding the side portions of the two films according to a tenter method and heating the films at a temperature between 190–220° C. and at a relaxation ratio of no more than 15% while air is introduced between the films.

* * * * *